(12) United States Patent
Macy et al.

(10) Patent No.: US 7,343,389 B2
(45) Date of Patent: Mar. 11, 2008

(54) APPARATUS AND METHOD FOR SIMD MODULAR MULTIPLICATION

(75) Inventors: William W. Macy, Palo Alto, CA (US); Hong Jiang, San Jose, CA (US); Eric Debes, Santa Clara, CA (US); Igor V. Kozintsev, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 625 days.

(21) Appl. No.: 10/137,560

(22) Filed: May 2, 2002

(65) Prior Publication Data

US 2003/0212727 A1    Nov. 13, 2003

(51) Int. Cl.
    *G06F 7/38*    (2006.01)
(52) U.S. Cl. .................................... 708/491
(58) Field of Classification Search ........ 708/490–491, 708/492, 620–650, 524, 300–323, 400–409
    See application file for complete search history.

(56) References Cited

U.S. PATENT DOCUMENTS

| | | | | |
|---|---|---|---|---|
| 4,393,457 A | * | 7/1983 | New | 708/404 |
| 4,908,874 A | * | 3/1990 | Gabriel | 708/308 |
| 6,073,154 A | * | 6/2000 | Dick | 708/401 |
| 6,115,812 A | | 9/2000 | Abdallah et al. | |
| 6,141,673 A | * | 10/2000 | Thayer et al. | 708/402 |
| 6,202,077 B1 | * | 3/2001 | Smith | 708/491 |
| 6,211,892 B1 | | 4/2001 | Huff et al. | |
| 6,349,318 B1 | * | 2/2002 | Vanstone et al. | 708/492 |
| 6,629,115 B1 | * | 9/2003 | Rossignol | 712/300 |
| 6,745,319 B1 | | 6/2004 | Balmer et al. | |
| 6,766,344 B2 | * | 7/2004 | Dubey et al. | 708/492 |
| 6,859,815 B2 | * | 2/2005 | Krishnamachari et al. | 708/400 |
| 7,085,795 B2 | | 8/2006 | Debes et al. | |
| 7,162,607 B2 | | 1/2007 | Macy et al. | |
| 2001/0016902 A1 | | 8/2001 | Abdallah et al. | |

OTHER PUBLICATIONS

Avaro, O., et al., MPEG-f Systems Overview and Architecture, woody.imag.fr/MPEG4/syssite/syspub/docs/tutuorial/, May 5, 1998, pp. 1-71 plus Yahoo site ref.

(Continued)

*Primary Examiner*—Chat C. Do
(74) *Attorney, Agent, or Firm*—Blakely, Sokoloff, Taylor & Zafman LLP

(57) ABSTRACT

An apparatus and method for single instruction multiple data (SIMD) modular multiplication are described. In one embodiment, the method includes selection of modular multiplication method available from an operating environment. Once the multiplication method is selected, a data access pattern for processing of data is selected. Finally, the selected modular multiplication method is executed in order to process data according to the selected data access pattern. In a further embodiment, a SIMD modular multiplication instruction is provided in order to enable simultaneous modular multiplication of multiplicand and multiplier operands, which may be vertically or horizontally accessed from memory, as indicated by a selected data access pattern. Alternatively, modular multiplication is implemented utilizing a SIMD byte shuffle operation, which enables modular multiplication of a constant multiplicand value to varying data multiplier values.

24 Claims, 21 Drawing Sheets

OTHER PUBLICATIONS

Bierling, M., "Displacement Estimation by Hierarchical Blockmatching," *SPIE, vol. 1001, Visual Communications and Image Processing*, Nov. 1988, pp. 942-951.

Chan, Y.L. and W.C. Shiu, "Adaptive Multiple-Candidate Hierarchical Search fro Block Matching Algorithm," *IEEE Electronics Letters*, vol. 31, No. 19, Sep. 14, 1995, pp. 1637-1639.

Chan, Y.L. and W.C. Shiu, "New Adaptive Pixel Decimation for Block Motion Vector Estimation," *IEEE Transactions on Circuits and Systems on Video Technology*, vol. 6, No. 1, Feb. 1996, pp. 113-118.

Chen, L.G., et al., "An Efficient Parallel Motion Estimation Algorithm for Digital Image Processing," *IEEE Transactions on Circuits and Systems on Video Technology*, vol. 1, No. 4, Dec. 1991, pp. 378-384.

Cheng, K.W. and S.C. Chan, "Fast Block Matching Algorithms for Motion Estimation," *ICASSP96*,1996, pp. 2311-2314.

Corbal, J., et al., "DLP + TLP Processors for the Next Generation of Media Workloads, " *IEEE* 0-7695-1019-1/01, 2001, pp. 219-228.

Day, N., Ed., "Introduction to MPEG-7 (v.3.0)", *International Oragnization for Standardization*, ISO/IEC JTC1/SC29/WG11, Coding of Moving Pictures and Audio, #N4032, Mar. 2001, pp. 1-10.

Diefendorff, K., et al., "AltiVec Extension to PowerPC Accelerates Media Processing," *IEEE*, #0272-1732/00, 2000, pp. 85-92.

Dufaux, F., et al., Efficient, Robust, and Fast Global Motion Estimation for Video Coding, *IEEE Transactions on Image Processing*, vol. 9, No. 3 1057-7149/00, Mar. 2000, pp. 497-501.

Eckart, S. and C. Fogg, "ISO/IEC MPEG-2 Software Video Codec, " *SPIE vol. 2419, Digital Video Compression: Algorithms and Technologies*, 1995, San Jose, CA, pp. 100-109.

Edirisinghe, E.A., et al., "Shape Adaptive Padding for MPEG-4," *IEEE Transactions on Consumer Electronics*, vol. 46, No. 3, 0098 3063/00, aug. 2000, pp. 514-520.

Feng, J., et al., "Adaptive Block Matching Motion Estimation Algorithm for Video Coding, " *IEE Electronics Letters*, vol. 31, No. 18, 1995, pp. 1542-1543.

Furht, B., et al., *Motion Estimation Algorithm for Video Compression*, Kluwer Academics Publishers, Boston, 1997, pp. cover-vi, 11, 49-95.

Ghanbari, M., The Cross-Search Algorithm for Motion Estimation, *IEEE Transactions on Communications*, vol. 38, No. 7, Jul. 1990, pp. 950-953.

He, Z. and M.L. Liou, "A High Performance Fast Search Algorithm for Block Matching Motion Estimation," *IEEE Transactions on Circuits and Systems on Video Technology*, vol. 7, No. 5, OCt. 1997, pp. 826-828.

He, Z. and M.L. Liou, "Design of Fast Motion Estimation Algorithm Based on Hardware Consideration," *IEEE Transactions on Circuits and Systems on Video Technology*, vol. 7, No. 5, Oct. 1997, pp. 819-823.

Heising, G., et al., "MoMuSys; MPEG-4 Version 2 Video Reference Software Package," *AC098/HHI/WP5.1/DS/P/049/BI*, 1998, Abstract and pp. 1-8.

Intel Corporation, *Block-Matching in Motion Estimation Algorithms Using Streaming SIMD Extension 2* (SSE2), Vers. 2.0, Sep. 22, 2000, Order No. 248605-001, pp. 1-13, A-1, A-2.

International Organisation for Standardisation, *Optimization Model, Version 2.0*, ISO/IEC JTC1/Sc29/WG11, Coding of Moving Pictures and Audio, #N3675, Oct. 2000, 12 pages.

International Organisation for Standardisation, *New MPEG-4 Profiles Under Considersation*, ISO/IEC JTC1/SC29/WG11, Coding of Moving Pictures and Audio, #N3932, Jan. 2001, pp. 1-35.

Jain, J. and A. Jain, "Displacement Measurement and its Application in Iterframe Image Coding," *IEEE Transactions on Communications*, vol. 29, No. 12, Dec. 1981, pp. 1799-1808.

Ju, J.C.-H., et al., "A Fast Rate-Optimized Motion Estimation Algorithm for Low-Bit-Rate Video Coding," *IEEE Transactions on Circuits and Systems for Video Technology*, vol. 9, No. 7, Oct. 1999, pp. 994-1002.

Jung, H.M., et al., "An Annular Search Algorithm for Efficient Motion Estimation," *International Picture Coding Symposium, PCS96*, 1996, pp. 171-174.

Kappagantula, S. and K.R. Rao, Motion Compensated Interframe Image Prediction, *IEEE Transactions on Communications*, vol. 33, No. 9, Sep. 1985, pp. 1011-1015.

Kim, J.S. and R.H Park, A Fast Feature-Based Block Matching Algorithm Using Integral Projections, *IEEE Journal on Selected Areas in Communications*, vol. 10, No. 5, Jun. 1992, pp. 968-971.

Kim, M., Ed., MPEG-4 Systems, *International Oragnization for Standardization, ISO/IEC JTC1/SC29/WG11, Coding of Moving Pictures and Audio*, #N3383, Jun. 2000, pp. 1-19.

Kneip, J., et al., Applying and Implementing the MPEG-4 Multimedia Standard, *IEEE Micro*, 0272-1732/99, 1999. pp. 64-74.

Kneip, J., et al., "The MPEG-4 Video Coding Standard-VLSI Point of View," *IEEE Workshop on Signal Processing Systems (SIPS98)*, Oct. 8-10, 1998, pp. 43-52, A-1, A-2.

Koenen, R., Ed., "Overview of the MPEG-4 Standard," *International Oragnization for Standardization, ISO/IEC JTC1/SC29/WG11, Coding of Moving Pictures and Audio*, #N4030. Mar. 2001, pp. 1-69.

Koga, T., et al., Motion Compensated Interframe Coding for Video Conferencing, *Proceedings of the National Telecommunications Conference*, 1981, pp. G5.3.1-5.3.3.

Kuhn, P., *Algorithms, Complexity Analysis and VLSI Architectures for MPEG-4 Motion Estimation*, Kluwer Academic Publishers, Boston, 1999, pp. cover-vi, 15, 17-59, 107-109, 119-121, 147-167 and 189-204.

Kuhn, P. and W. Stechele, "Complexity Analysis of the Emerging MPEG-4 Standard as a Basis for VLSI Implementation," *SPIE vol. 3309, Visual Communications and Image Processing*, San Jose, Jan. 1998, pp. 498-509.

Lee, L.W., et al., "Dynamic Search-Window Adjust and Interlaced Search Block-Matching Algorithm," *IEEE Transactions ob Circuits and Systems for Video Technology*, vol. 3, No. 1, Feb. 1993, pp. 85-87.

Lee, W., et al., "Media Station 5000: Integrating Video and Audio," *IEEE Multimedia*, vol. 1, No. 4, 1994, pp. 50-61.

Lee, X. and Y.Q. Zhang, "A Fast Hierarchical Motion-Compensation Scheme for Video Coding Using Block Feature Matching," *IEEE Transactions on Circuits and Systems for Video Technology*, vol. 6, Dec. 1996, pp. 627-635.

Lengwehassatit, K., et al., "A Novel Computationally Scalable Algorithm for Motion Estimation," *SPIE vol. 3309 Visual Communications and Image Processing*, San Jose, Jan. 1998, pp. 66-79.

Li, R., et al., A New Three-Step Search Algorithm for Block Motion Estimation, *IEEE Transaction on Circuits and Systems on Video Technology*, vol. 4, No. 4, Aug. 1994, pp. 438-442.

Li, W. and E. Salari, Successive Elimination Algorithm for Motion Estimation, *IEEE Transactions on Image Processing*, vol. 4, No. 1, Jan. 1995, pp. 105-107.

Liang, J., et al., "Region-Based Video Coding with Embedded Zero-Trees," *IEEE* 1068-0314/97, 1997, p. 449.

Liu, B. and A. Zaccarin, New Fast Algorithms for the Estimation of Block Motion Vectors, *IEEE Transactions on Circuits and Systems for Video Technology*, vol. 3, No. 2, Apr. 1993, pp. 148-157.

Liu, L.K. and E. Feig, "A Block-Based Gradient Descent Search Algorithm for Block Motion estimation in Video Coding," *IEEE Transactions on Circuits and Systems for Video Technology*, vol. 6, No. 4, Aug. 1996, pp. 419-422.

Mo, H.C., et al., "A High-Speed Pattern Decoder in MPEG-4 Padding Block Hardware Accelerator, " *IEEE* 0-7803-6685-9/01, 2001, pp. II-197-II-200.

Moschetti, F. and E. Debes, About Macroblock Subsampling for motion Estimation on IA-64, *Proceedings of 2001 IEEE International Conference on Multimedia and Expo (ICME 2001)*, Tokyo, Japan, Aug. 2001, 4 pages.

Moschetti, F. and E. Debes, "A Fast Block Matching for SIMD Processors Using Subsampling," *IEEE International Symposium on Circuits and Systems*, #0-7803-5482-6/99, May 2000, pp. IV-321-IV-324.

Nam, K.M., et al., "A Fast Hierarchical Motion Vector Estimation Algorithm Using Mean Pyramid," *IEEE Transactions on Circuit and Systems for Video Technology*, vol. 5, No. 4, Aug. 1995, pp. 344-351.

Netravali, A. and B. Haskell, *Digital Pictures: Representation and Compression*, Plenum, New York, 1988, pp. cover-xv, 334-340, 537-542 and 354-355.

Pirsch, P., et al., "VLSI Architectures for Video Compression-A Survey," *Proceedings of the IEEE*, vol. 83, No. 2, Feb. 1995, pp. 220-246.

Po, L.M. and W.C. Ma, "A Novel Four-Step Search Algorithm for Fast Block Motion Estimation," *IEEE Transactions on Circuits and Systems fro Video Technology*, vol. 6, No. 3, jun. 1996, pp. 313-317.

Puri, A., et al., "An Efficient Block-Matching Algorithm fro Motion Compensated Coding," *Proceedings of IEEE ICASSP*, 1987, pp. 1063-1066.

Ragsdale, G.L., et al., "Relationships of Popular Transmission Characteristics to perceived Quality fro Digital Video over ATM," *National Communications System, Technical Information Bulletin 99-2*, Jan. 1999, 64 pages.

Ramkishor, K., et al., "Real Time Implementation of MPEG-4 Video Decoder on ARM7TDMI," *Proceedings of 2001 International Symposium on Intelligent Multimedia, Video and Speech Processing*, May 2-4, 2001, pp. 522-526.

Shi, Y.Q. and X. Xia, "A Thresholding Multiresolution Block Matching Algorithm," *IEEE Transactions on Circuits and Systems fro Video Technology*, vol. 7, No. 2, Apr. 1997, pp. 437-440.

Sikora, T., "MPEG Digital Video Coding Standards," Preprint from *Digital Consumer Electronics handbook*, 1st edition, McGraw-Hill Book Co., Ch. 9, pp. 1-43, no date.

Sikora, T., "MPEG-1 and MPEG-2 Digital Video Coding Standards," Preprint from *Digital Consumer Electronics Handbook*, 1st Edition, McGraw-Hill Book Co., pp. 1-43, no date.

Sikora, T., "The Structure of the MPEG-4 Video Coding Algorithm," submitted to *IEEE Trans. CSVT*, Jun. 1996, pp. 1-16.

Song, B.C. and J.B. Ra, "A Hierarchical Block Matching Algorithm Using Partial Distortion Criterion," *SPIE vol. 3309 VCIP Visual Communications and Image Processing*, San Jose, CA, 1998, pp. 88-95.

Srinivasan, R. and K.R. Rao, "Predictive Coding Based on Efficient Motion Estimation," *IEEE Transactions onn Communications*, vol. COM-33, No. 8, Aug. 1985, pp. 888-896.

Stolberg, H.-J., et al., "The M-Pire MPEG-4 Codec DSP and Its Macroblock Engine," *IEEE Symposium on Circuits and Systems*, 07-7803-548206/99, May 2000, pp. II-192-II-195.

Tham, J.Y., et al., "A Novel Unrestricted Center-Biased Diamond Search Algorithm for Block Motion Estimation," *IEEE Transactions on Circuits and Systems fro Video Technology*, vol. 8, No. 4, 1998, pp. 369-377.

Van der Schaar, M., et al., "Near-Lossless Complexity-Scalable Embedded Compression Algorithm for Cost Reduction in DTV Receivers," *IEEE Transactions on Consumer Electronics*, vol. 46, No. 4, Nov. 2000, pp. 923-933.

Wang, C.N., et al., "Improved MPEG-4 Visual Texture Coding Using Double Transform Coding," *IEEE* 0-7803-6685-9/01, 2001, pp. V-227 - V-230.

Westerink, P.H., et al., "Two-Pass MPEG-2 Variable-Bit-Rate Encoding," *IBM J. Res. Develop.*, vol. 43, No. 4, Jul. 1999, pp. 471-488.

Wittenburg, J.P., et al., "HiPar-DSP: A Parallel VLIW RISC Processor fro Real Time Image Processing Applications," *IEEE* 0-7803-4229-1/97, 1997, pp. 155-162.

Xu, J.B., et al., "A New Prediction Model Search Algorithm for Fast Block Motion Estimation," *IEEE International Conference on Image Processing (ICIP97)*, Santa Barbara, 1997, pp. 610-613.

Yu, F. and A.N. Wilson, Jr., "A Flexible Hardware-Oriented Fast Algorithm for Motion Estimation," *ICASSP97*, 1997, pp. 2681-2683.

Zhu, S. and K.K Ma, "A New Diamond Search Algorithm for Fast Block Matching," *IEEE Transactions on Circuits and Systems for Video Technology*, vol. 9, No. 2, Feb. 2000, pp. 287-290.

* cited by examiner

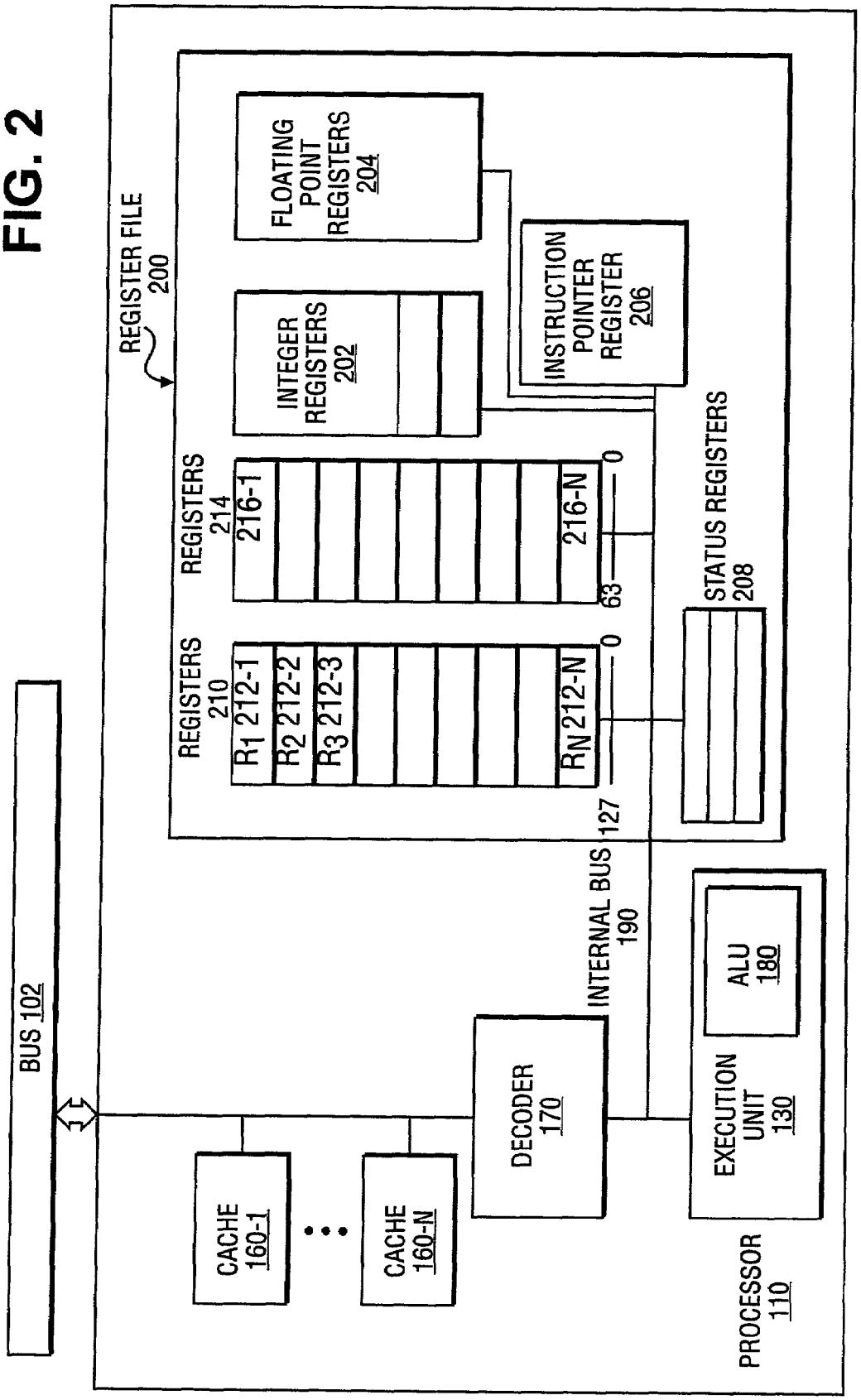

| 127 | 120 119 | 112 111 | 104 103 | | 24 23 | 16 15 | 8 7 | 0 |
|---|---|---|---|---|---|---|---|---|
| bbbb bbbb | bbbb bbbb | bbbb bbbb | · · · | bbbb bbbb | bbbb bbbb | bbbb bbbb |

UNSIGNED PACKED BYTE IN-REGISTER REPRESENTATION 286

| 127 | 120 119 | 112 111 | 104 103 | | 24 23 | 16 15 | 8 7 | 0 |
|---|---|---|---|---|---|---|---|---|
| sbbb bbbb | sbbb bbbb | sbbb bbbb | · · · | sbbb bbbb | sbbb bbbb | sbbb bbbb |

SIGNED PACKED BYTE IN-REGISTER REPRESENTATION 288

FIG. 5A

127   112 111                                           1615                          0
| wwww wwwww wwwww |                        | wwwww wwwww wwwww |
UNSIGNED PACKED WORD IN-REGISTER REPRESENTATION 290

127   112 111                                           1615                          0
| swww wwwww wwwww |                        | swwww wwwww wwwww |
SIGNED PACKED WORD IN-REGISTER REPRESENTATION 292

FIG. 5B

127             96 95            32 31                        0
| dddd dddd dddd dddd dddd | ••• | dddd dddd dddd dddd dddd |
UNSIGNED DOUBLEWORD IN-REGISTER REPRESENTATION 294

127             96 95            32 31                        0
| sddd dddd dddd dddd dddd | ••• | sddd dddd dddd dddd dddd |
SIGNED DOUBLEWORD IN-REGISTER REPRESENTATION 296

FIG. 5C

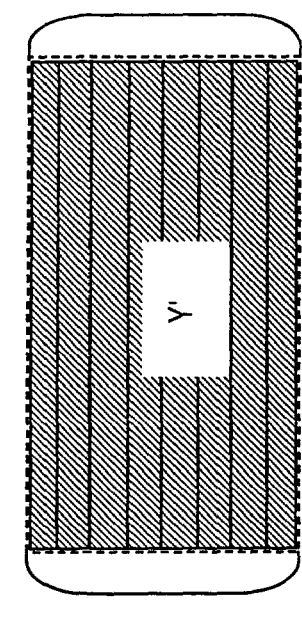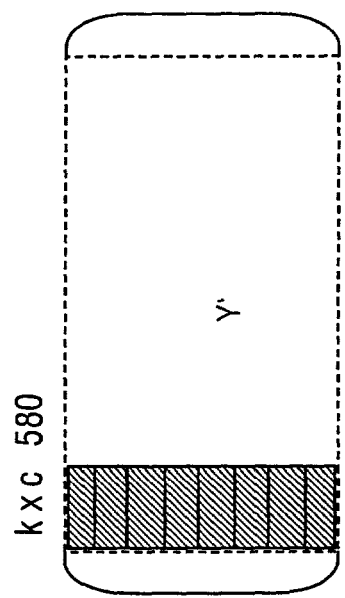
FIG. 9A
FIG. 9B
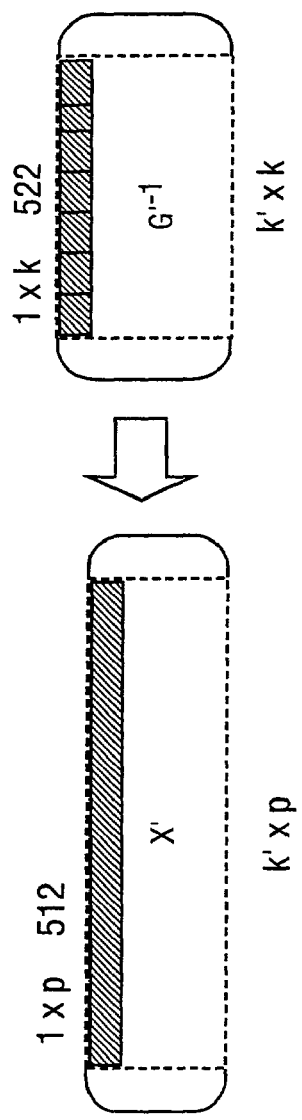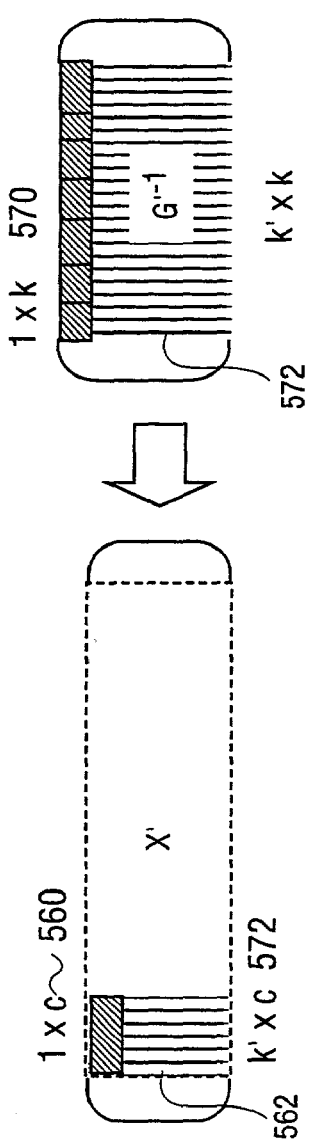

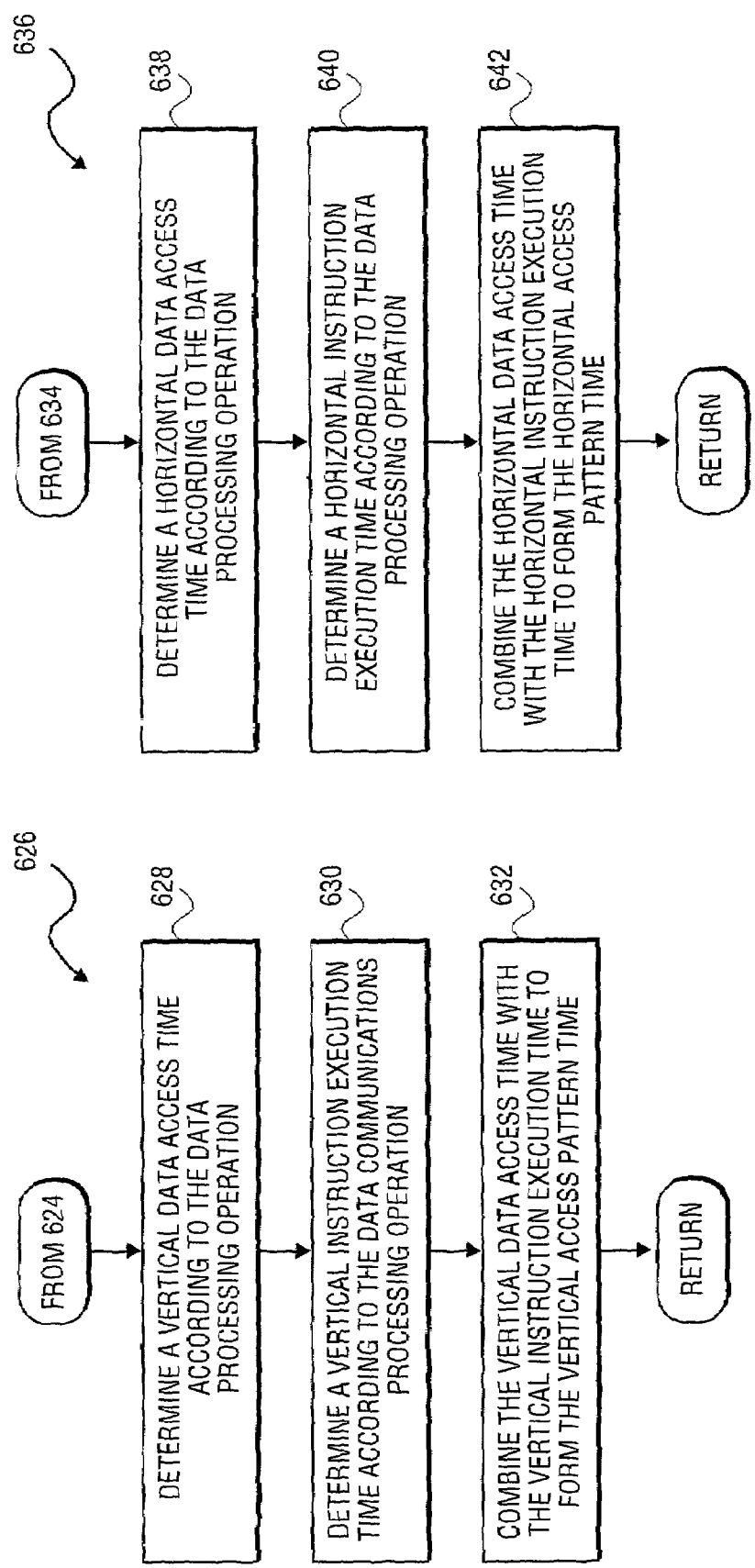

APPARATUS AND METHOD FOR SIMD MODULAR MULTIPLICATION

CROSS-REFERENCE TO RELATED APPLICATIONS

The present application is related to U.S. patent application Ser. No. 09/945,422, entitled "APPARATUS AND METHOD FOR A DATA STORAGE DEVICE WITH A PLURALITY OF RANDOMLY LOCATED DATA," now U.S. Pat. No. 7,162,607, and U.S. patent application Ser. No. 09/952,891, entitled "APPARATUS AND METHOD FOR EFFICIENT FILTERING AND CONVOLUTION OF CONTENT DATA," now U.S. Pat No. 7,085,795.

FIELD OF THE INVENTION

One or more embodiments of the invention relates generally to the fields of encryption and communications algorithms. More particularly, one embodiment of the invention relates to a method and apparatus for single instruction, multiple data (SIMD) modular multiplication.

BACKGROUND OF THE INVENTION

Media applications, including wireless communication, have been driving microprocessor development for more than a decade. In fact, most computing upgrades, in recent years, have been driven by either wireless communications or media applications predominantly within the computer segment, but also in enterprise segments for entertainment, enhanced education and communication purposes. Nevertheless, future wireless, as well as media applications, will require even higher computational requirements. As a result, tomorrow's personal computer (PC) will be even richer in audio visual effects, as well as improved usability, while wireless communications will enable computing to merge with communications.

Current wireless communication applications, including cellular phones as well as wireless networks and the like, are slowly replacing landline telephones as well as wired communication networks. However, as such wireless devices begin to proliferate current operating environments, protection of the communications information exchanged between such devices becomes increasingly important. As a result, encryption algorithms are commonly used to protect the integrity of transmitted content, while error control algorithms are used to recapture content in the event of lost of corrupted data during transmission.

Unfortunately, a very significant number of wireless communications, as well as encryption algorithms, utilize look-up tables. As known to those skilled in the art, look-up tables store results of computationally intensive operations which are calculated before an application start-up or during initialization application. In addition, some applications access data within the look-up tables in the random pattern. Consequently, it is often difficult to exploit any data level parallelism utilizing, for example, single instruction multiple data (SIMD) instructions. This is due to the fact that current instructions have no efficient way for loading a register in response to execution of a single instruction with data that is stored within randomly located addresses.

Moreover, current encryption, as well as communication algorithms are performed utilizing modular multiplication. For example, advanced encryption standards (AES), symmetric key encryption algorithms for both data, such as Rijndael and Twofish, use modular multiplication of bytes.

As known to those skilled in the art, Rijndael is the AES encryption algorithm chosen to replace the data encryption standard (DES). In fact, secure sockets layer used for security in Netscape™ and Internet Explorer™ browsers is an application in which Rijndael will become widely used. Moreover, forward error control (FEC) provides error control algorithms for dealing with packet erasures used in wireless communications. FEC also utilizes modular multiplication of bytes.

As a result, both secure network transmissions and wireless communications require real time processing of large amounts of data. Unfortunately, modular multiplication is too computationally intensive to compute in real time. Currently, modular multiplication is implemented utilizing look-up tables that are accessed with scalar code load instructions. However, the table look-up methods only load one modular multiplication product per instruction. Consequently, these look-up table implementations can not exploit the data parallelism in the encryption and FEC algorithms.

Modular multiplication is performed utilizing finite field arithmetic. As known to those skilled in the art, there are several types of finite fields. The type used by the Rijndael, Twofish and FEC algorithms is referred to as Galois fields (GF) GF $(2^8)$. As known to those skilled in the art, the 2 refers to the number of values a symbol may have (e.g., 0 or 1) and the exponent 8 refers to the number of symbols in an element; namely, the number of symbols in a byte. Consequently, GF $(2^8)$ is well suited to calculations performed by computer operation.

Moreover, in finite fields GF $(2^8)$, addition and subtraction are implemented with a byte or exclusive-OR (XOR) operation and multiplication is implemented with modular multiplication. Consequently, in each of the cases, the sum difference and products are also bytes. Unfortunately, the scalar multiplication look-up table methods utilized by current modular multiplication operations performed by encryption and communication algorithms cannot exploit the data level parallelism offered by finite field modular multiplication. Therefore, there remains a need to overcome one or more of the limitations in the above-described, existing art.

BRIEF DESCRIPTION OF THE DRAWINGS

The various embodiments of the present invention are illustrated by way of example, and not by way of limitation, in the figures of the accompanying drawings and in which:

FIG. 2 depicts a block diagram illustrating an embodiment of the processor, as depicted in FIG. 1, in accordance with a further embodiment of the present invention.

FIG. 5A illustrates an in-register packed byte representation according to one embodiment of the present invention.

FIG. 5B illustrates an in-register packed word representation according to one embodiment of the present invention.

FIG. 5C depicts a block diagram illustrating an in-register packed quad word representation according to one embodiment of the present invention.

FIGS. 9A and 9B depict data access methods for performing a data processing operation in accordance with one embodiment of the present invention.

FIG. 13 depicts a flowchart illustrating an additional method for determining a vertical access pattern time in accordance with the further embodiment of the present invention.

FIG. 14 depicts a flowchart illustrating an additional method for determining a horizontal access pattern time in accordance with the further embodiment of the present invention.

DETAILED DESCRIPTION

Figure 1:
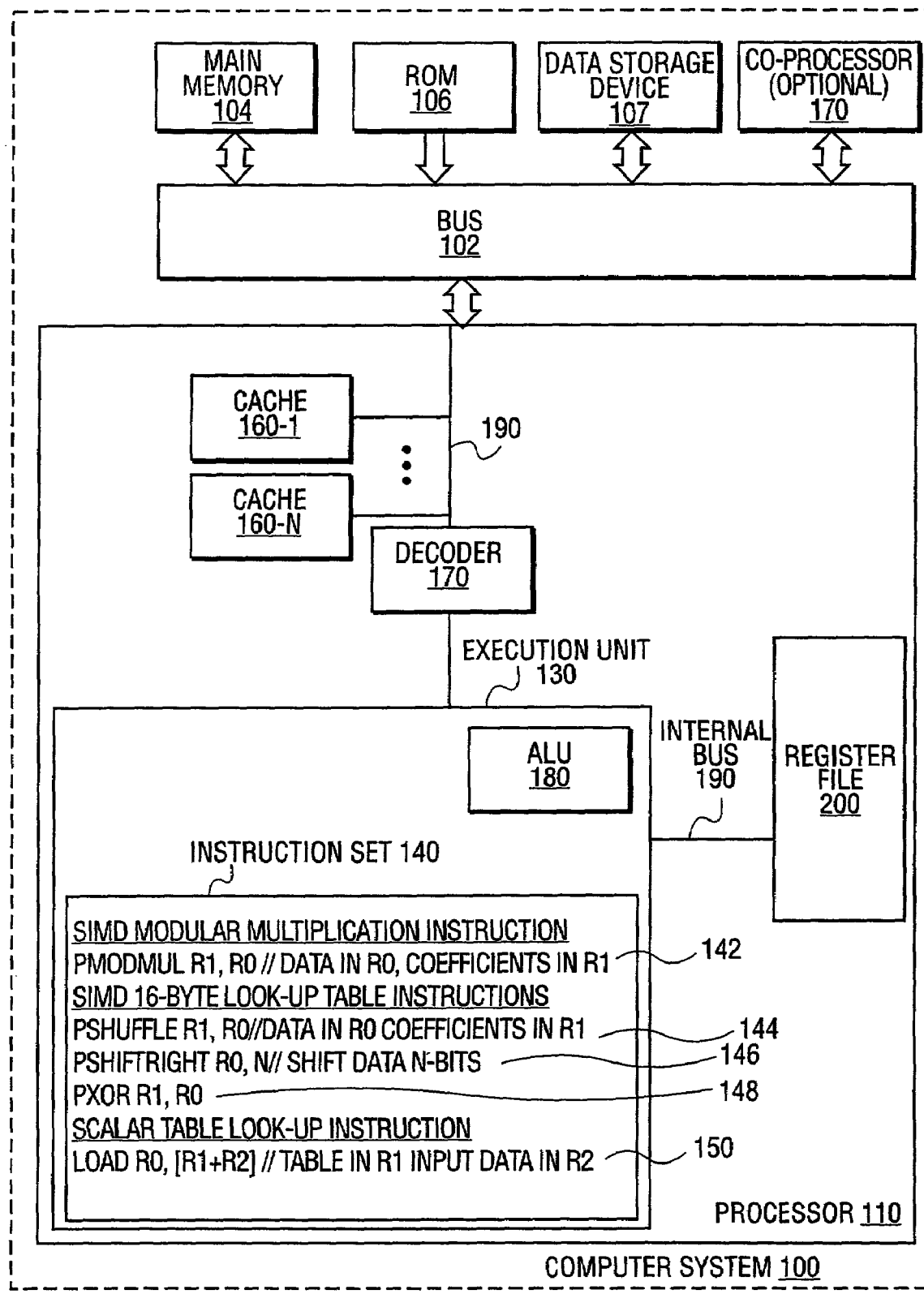
FIG. 1 depicts a block diagram illustrating a computer system implementing modular multiplication methods in accordance with one or more embodiments of the present invention.

A method and apparatus for SIMD modular multiplication are described. In one embodiment, the method includes selection of modular multiplication method available from an operating environment. Once the multiplication method is selected, a data access pattern for processing of data is selected. Finally, the selected modular multiplication method is executed in order to process data according to the selected data access pattern. In a further embodiment, a single instruction multiple data (SIMD) modular multiplication instruction is provided in order to enable simultaneous modular multiplication of multiplicand and multiplier operands, which may be vertically or horizontally accessed from memory, as indicated by a selected data access pattern. Alternatively, modular multiplication is implemented utilizing a SIMD byte shuffle operation, which enables modular multiplication of a constant multiplicand value to varying data multiplier values.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the embodiments of the present invention can be implemented in hard-wired circuitry, by programming a general-purpose processor, or by any combination of hardware and software.

One of skill in the art will immediately appreciate that the embodiments of the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

In an embodiment, the methods of the present invention are embodied in machine-executable instructions. The instructions can be used to cause a general-purpose or special-purpose processor that is programmed with the instructions to perform the methods of the present invention. Alternatively, the methods of the present invention might be performed by specific hardware components that contain hardwired logic for performing the methods, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the embodiments of the present invention may also be downloaded as a computer program product. As such, the program may be transferred from a remote computer (e.g., a server) to a requesting computer (e.g., a client). The transfer of the program may be by way of a communication link (e.g., a modem, network connection or the like).

Computing Architecture

FIG. 1 shows a computer system 100 upon which one embodiment of the present invention can be implemented. Computer system 100 comprises a bus 102 for communicating information, and processor 110 coupled to bus 102 for processing information. The computer system 100 also includes a memory subsystem 104-108 coupled to bus 102 for storing information and instructions for processor 110. Processor 110 includes an execution unit 130 containing an arithmetic logic unit (ALU) 180, a register file 200, one or more cache memories 160 (160-1, . . . , 160-N) and an internal bus 190.

High speed, temporary memory buffers (cache) 160 are coupled to execution unit 130 and store frequently and/or recently used information for processor 110. As described herein, memory buffers 160, include but are not limited to cache memories, solid state memories, RAM, synchronous RAM (SRAM), synchronous data RAM (SDRAM) or any device capable of supporting high speed buffering of data. Accordingly, high speed, temporary memory buffers 160.

In addition, it should be noted that in an alternative embodiment, the term memory buffer refers to the external memory 104. However, in contrast to conventional video/image processing systems, the system 100 includes instructions for implementing SIMD modular multiplication. As described in further detail below, one embodiment of the present invention includes the ability to speed up modular multiplication for finite field GF ($2^8$). In one embodiment, the present invention describes two SIMD modular multiplication methods and shows how to select between the two methods. In one embodiment, the first method utilizes a new, special purpose SIMD modular multiplication instruction. In accordance with this embodiment, a second method provides a general purpose byte shuffle instruction that is utilized to implement SIMD modular multiplication, utilizing two 16-byte tables that are stored in a 128-bit register. The byte shuffle instruction is used for ordering data for operations, such as filtering, in order to enable shuffling of values within the two 16-byte tables in order to form a final modular multiplication value.

In one embodiment of the invention, register file 200 includes multimedia registers, for example, SIMD (single instruction, multiple data) registers for storing multimedia information. In one embodiment, multimedia registers each store up to one hundred twenty-eight bits of packed data. Multimedia registers may be dedicated multimedia registers or registers which are used for storing multimedia information and other information. In one embodiment, multimedia registers store multimedia data when performing multimedia operations and store floating point data when performing floating point operations.

In one embodiment, execution unit 130 operates on image/video data according to the instructions received by processor 110 that are included in instruction set 140. Execution unit 130 also operates on packed, floating-point and scalar data according to instructions implemented in general-purpose processors. Processor 110 as well as cache processor 400 are capable of supporting the Pentium® microprocessor instruction set as well as packed instructions, which operate on packed data. By including a packed instruction set in a standard microprocessor instruction set, such as the Pentium® microprocessor instruction set, packed data instructions can be easily incorporated into existing software (previously written for the standard microprocessor instruction set). Other standard instruction sets, such as the PowerPC™ and the Alpha™ processor instruction sets may also be used in accordance with the described invention. (Pentium® is a registered trademark of Intel Corporation. PowerPC™ is a trademark of IBM, APPLE COMPUTER and MOTOROLA. Alpha™ is a trademark of Digital Equipment Corporation.)

In one embodiment, the invention provides a plurality of modular multiplication instructions. Accordingly, as illustrated in FIG. 1, the instruction set includes SIMD modular multiplication operations (PMODMUL) 142, SIMD 16-Byte Look-Up Table Instruction (instructions 144-148) and scalar load look-up table instruction 150. Utilizing these operations, image/video applications may more efficiently implement encryption, error control and data look-up methods that require performing of modular multiplication. In addition, one embodiment of the PMODMUL instructions 142 is utilized to simultaneously multiply corresponding byte values within SIMD registers.

The PSHUFFLE instruction 144 is utilized to organize data within 64-bit registers, for example, registers 214 as depicted in FIG. 2, and 128-bit registers, such as registers 210 as depicted in FIG. 2 (R1) according to address or data within a register (RO). Further details regarding PSHUFFLE 144 are provided below. As described in further detail below, the scalar look-up table instructions are performed using a load R0, [R1 R2] such that results are stored in register R0, while a table is contained in R1 and input data is in R2.

By including the instruction set 140 in the instruction set of the general-purpose processor 110, along with associated circuitry to execute the instructions, the operations used by many existing multimedia applications may more efficiently perform encrypting and error control using a general-purpose processor. Thus, security for multimedia applications including video/image coding may be accelerated and executed more efficiently by utilizing a single instruction to perform modular multiplication. In addition, packed instructions enable using the full width of a processor's data bus for performing operations on packed data. This eliminates the need to transfer smaller units of data across the processor's data bus to perform one or more operations one data element at a time.

Still referring to FIG. 1, the computer system 100 of the present invention may include one or more I/O (input/output) devices 120, including a display device such as a monitor. The I/O devices 120 may also include an input device such as a keyboard, and a cursor control such as a mouse, trackball, or trackpad. In addition, the I/O devices may also include a network connector such that computer system 100 is part of a local area network (LAN) or a wide area network (WAN), the I/O devices 120, a device for sound recording, and/or playback, such as an audio digitizer coupled to a microphone for recording voice input for speech recognition. The I/O devices 120 may also include a video digitizing device that can be used to capture video images, a hard copy device such as a printer, and a CD-ROM device.

Processor

FIG. 2 illustrates a detailed diagram of processor 110. Processor 110 can be implemented on one or more substrates using any of a number of process technologies, such as, BiCMOS, CMOS, and NMOS. Processor 110 comprises a decoder 170 for decoding control signals and data used by processor 110. Data can then be stored in register file 200 via internal bus 190. As a matter of clarity, the registers of an embodiment should not be limited in meaning to a particular type of circuit. Rather, a register of an embodiment requires the capability of storing and providing data, and performing the functions described herein.

Depending on the type of data, the data may be stored in integer registers 202, registers 210, registers 214, status registers 208, or instruction pointer register 206. Other registers can be included in the register file 204, for example, floating point registers 204. In one embodiment, integer registers 202 store thirty-two bit integer data. In one embodiment, registers 210 contains eight multimedia registers, R0 212-1 through R7 212-7, for example, single instruction, multiple data (SIMD) registers containing packed data. In one embodiment, each register in registers 210 is one hundred twenty-eight bits in length. R1 212-1, R2 212-2 and R3 212-3 are examples of individual registers in registers 210. Thirty-two bits of a register in registers 210 can be moved into an integer register in integer registers 202. Similarly, value in an integer register can be moved into thirty-two bits of a register in registers 210.

In one embodiment, registers 214 contains eight multimedia registers, 216-1 through 216-N, for example, single instruction, multiple data (SIMD) registers containing packed data. In one embodiment, each register in registers 214 is sixty-four bits in length. Thirty-two bits of a register in registers 214 can be moved into an integer register in integer registers 202. Similarly, value in an integer register can be moved into thirty-two bits of a register in registers 214. Status registers 208 indicate the status of processor 109. In one embodiment, instruction pointer register 211 stores the address of the next instruction to be executed. Integer registers 202, registers 210, status registers 208, registers 214, floating-point registers 204 and instruction pointer register 206 all connect to internal bus 190. Any additional registers would also connect to the internal bus 190.

In another embodiment, some of these registers can be used for different types of data. For example, registers 210/214 and integer registers 202 can be combined where each register can store either integer data or packed data. In another embodiment, registers 210/214 can be used as floating point registers. In this embodiment, packed data or floating point data can be stored in registers 210/214. In one embodiment, the combined registers are one hundred ninety-two bits in length and integers are represented as one hundred ninety-two bits. In this embodiment, in storing packed data and integer data, the registers do not need to differentiate between the two data types.

Execution unit 130, in conjunction with, for example ALU 180, performs the operations carried out by processor 110. Such operations may include shifts, addition, subtraction and multiplication, etc. Functional unit 130 connects to internal bus 190. In one embodiment, as described above, the system 100 includes one or more second memory buffers (cache) 160. The one or more cache memories 160 can be used to buffer data and/or control signals from, for example, main memory 104. In addition, the cache memories 160 are connected to decoder 170, and connected to receive control signals.

Data and Storage Formats

Figure 3A:
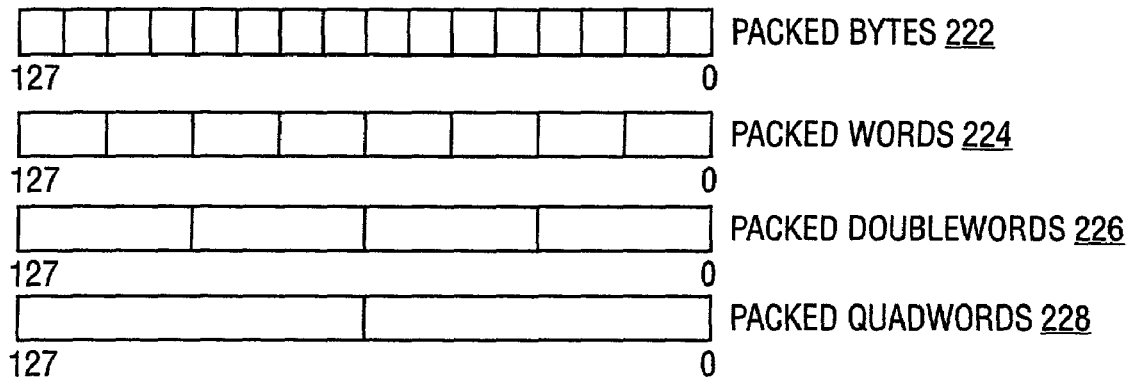
FIGS. 3A and 3B depict block diagrams illustrating 128-bit SIMD data types in accordance with one embodiment of the present invention.
Figure 3B:
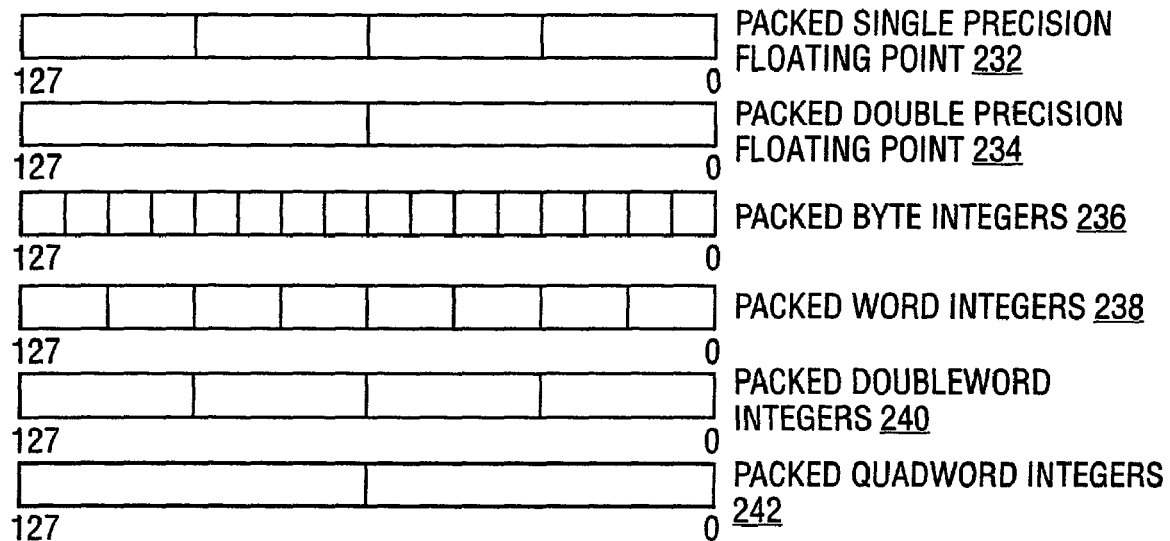

Referring now to FIGS. 3A and 3B, FIGS. 3A and 3B illustrate 128-bit SIMD data type according to one embodiment of the present invention. FIG. 3A illustrates four 128-bit packed data-types 220, packed byte 222, packed word 224, packed doubleword (dword) 226 and packed quadword 228. Packed byte 222 is one hundred twenty-eight bits long containing sixteen packed byte data elements. Generally, a data element is an individual piece of data that is stored in a single register (or memory location) with other data elements of the same length. In packed data sequences, the number of data elements stored in a register is one hundred twenty-eight bits divided by the length in bits of a data element.

Packed word 224 is one hundred twenty-eight bits long and contains eight packed word data elements. Each packed word contains sixteen bits of information. Packed doubleword 226 is one hundred twenty-eight bits long and contains four packed doubleword data elements. Each packed doubleword data element contains thirty-two bits of information. A packed quadword 228 is one hundred twenty-eight bits long and contains two packed quad-word data elements. Thus, all available bits are used in the register. This storage arrangement increases the storage efficiency of the processor. Moreover, with multiple data elements accessed simultaneously, one operation can now be performed on multiple data elements simultaneously.

FIG. 3B illustrates 128-bit packed floating-point and Integer Data types 230 according to one embodiment of the invention. Packed single precision floating-point 232 illustrates the storage of four 32-bit floating point values in one of the SIMD registers 210, as shown in FIG. 2. Packed double precision floating-point 234 illustrates the storage of two 64-bit floating-point values in one of the SIMD registers 210 as depicted in FIG. 2. As described in further detail below, packed double precision floating-point 234 may be utilized to store an entire sub-matrix, utilizing two 128-bit registers, each containing four vector elements which are stored in packed double precision floating-point format. Packed byte integers 236 illustrate the storage of 16 packed integers, while packed word integers 238 illustrate the storage of 8 packed words. Finally, packed doubleword integers 240 illustrate the storage of four packed doublewords, while packed quadword integers 242 illustrate the storage of two packed quadword integers within a 128-bit register, for example as depicted in FIG. 2.

Figure 3C:
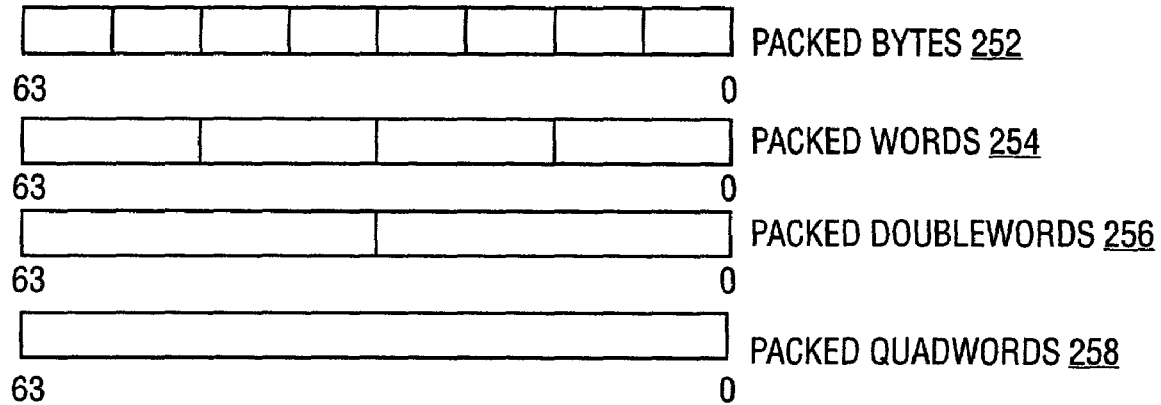
FIGS. 3C and 3D depicts 64-bit packed SIMD data types in accordance with the further embodiment of the present invention.
Figure 3D:
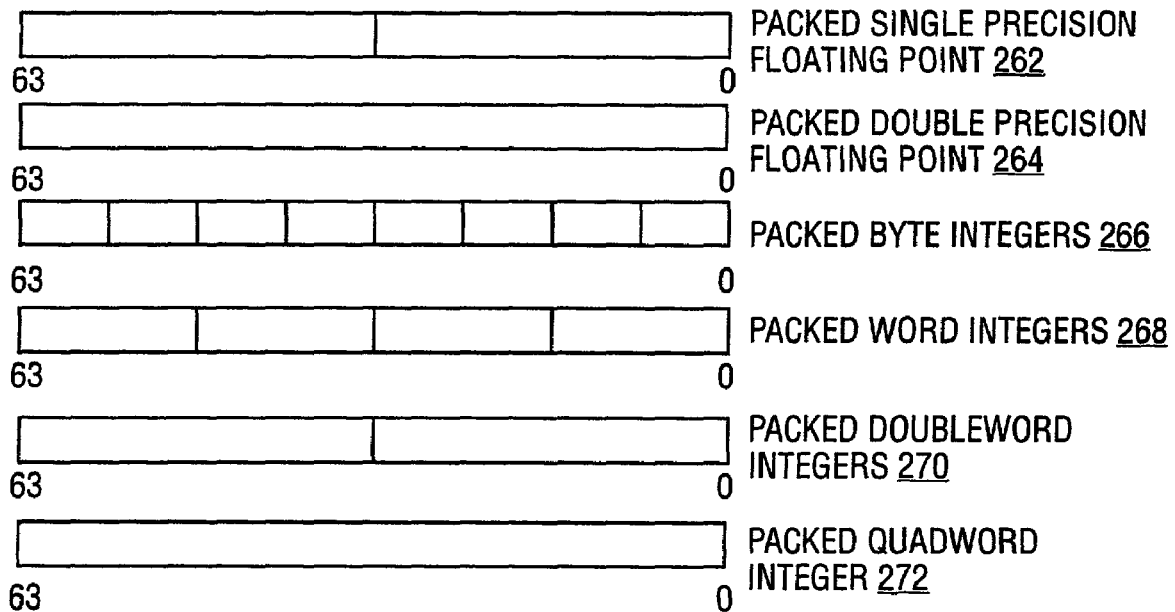
Figure 4:
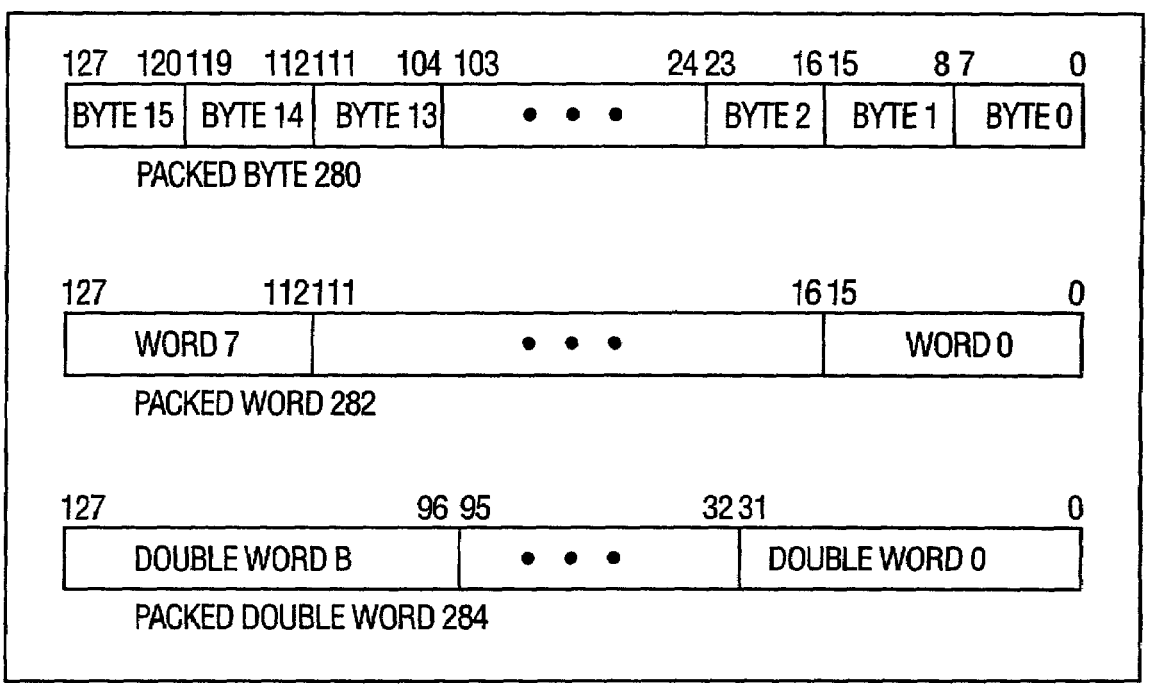
FIG. 4 depicts a block diagram illustrating packed SIMD data types according to a further embodiment of the present invention.

Referring now to FIGS. 3C and 3D, FIGS. 3C and 3D depict blocked diagrams illustrating 64-bit packed SIMD data types, as stored within registers 214, in accordance with one embodiment of the present invention. As such, FIG. 3C depicts four 64-bit packed data types 250, packed byte 252, packed word 254, packed doubleword 256 and packed quadword 258. Packed byte 252 is 64 bits long, containing 8 packed byte data elements. As described above, in packed data sequences, the number of data elements stored in a register is 64 bits divided by the length in bits of a data element. Packed word 254 is 64 bits long and contains 4 packed word elements. Each packed word contains 16 bits of information. Packed doubleword 256 is 64 bits long and contains 2 packed doubleword data elements. Each packed doubleword data element contains 32 bits of information. Finally, packed quadword 258 is 64 bits long and contains exactly one 64-bit packed quadword data element.

Referring now to FIG. 3D, FIG. 3D illustrates 64-bit packed floating-point and integer data types 260, as stored within registers 214, in accordance with a further embodiment of the present invention. Packed single precision floating point 262 illustrates the storage of two 32-bit floating-point values in one of the SIMD registers 214 as depicted in FIG. 2. Packed double precision floating-point 264 illustrates the storage of one 64-bit floating point value in one of the SIMD registers 214 as depicted in FIG. 2. Packed byte integer 266 illustrates the storage of eight 32-bit integer values in one of the SIMD registers 214 as depicted in FIG. 2. Packed doubleword integer 270 illustrates the storage of two 32-bit integer values in one of the SIMD registers 214 as depicted in FIG. 2. Finally, packed quadword integer 272 illustrates the storage of a 64-bit integer value in one of the SIMD registers 214 as depicted in FIG. 2.

FIGS. 5A-5C illustrate the in-register packed data storage representation according to one embodiment of the invention. Unsigned packed byte in-register representation 286 illustrates the storage of an unsigned packed byte 280 in one of the multimedia registers 310, as shown in FIG. 5A. Information for each byte data element is stored in bit seven through bit zero for byte zero, bit fifteen through bit eight for byte one, and up to bit one hundred twenty through bit one hundred twenty-seven for byte fifteen. Thus, all available bits are used in the register. This storage arrangement increases the storage efficiency of the processor. As well, with sixteen data elements accessed, one operation can now be performed on sixteen data elements simultaneously. Signed packed byte in-register representation 288 illustrates the storage of a signed packed byte 280. Note that the eighth bit of every byte data element is the sign indicator.

Unsigned packed word in-register representation 290 illustrates how word seven through word eight are stored in a register of multimedia registers 310, as illustrated in FIG. 5B. Signed packed word in-register representation 292 is similar to the unsigned packed word in-register representation 290. Note that the sixteenth bit of each word data element is the sign indicator. Unsigned packed doubleword in-register representation 294 shows how multi-media registers 209 store two doubleword data elements, as illustrated in FIG. 5C. Signed packed doubleword in-register representation 296 is similar to unsigned packed doubleword in-register representation 294. Note that the necessary sign bit is the thirty-second bit of the doubleword data element.

Modular Multiplication

As described above, a very significant number of wireless communications, as well as encryption algorithms, utilize look-up tables to perform modular multiplication operations. As described herein, algorithms using look-up tables to perform modular multiplication, such as error control algorithms, encryption algorithms and the like are interchangeably referred to herein as data processing operations or data communications operations. Consequently, it is often difficult to exploit any data level parallelism. Moreover, current encryption, as well as communications algorithms, utilize modular multiplication, which as described above, is often implemented utilizing look-up tables resulting in poor application performance. For example, AES symmetric key encryption for both data, such as Rijndael and Twofish, use modular multiplication of bytes. However, in order to avoid run-time computation of the modular multiplication, these algorithms utilize look-up tables to store the computationally intensive results.

As known to those skilled in art, modular multiplication is performed utilizing finite field arithmetic. Although there are several types of finite fields, the type used by the Rijndael, Twofish and FEC algorithms is referred to as Galois fields (GF) $GF(2^8)$. As known to those skilled in the art, the 2 refers to the number of values the symbol may have (e.g., 0 or 1) and the exponent 8 refers to the number of symbols in an element; namely, the number of symbols in a byte. Consequently, $GF(2^8)$ is well-suited to calculations performed by computer operations. Moreover, in finite fields, $GF(2^8)$ additional and subtraction are implemented with a byte or exclusive OR (XOR) operations and multiplication is implemented with modular multiplication. Consequently, in each of these cases, the sum and difference N products are also bytes.

Referring again to $GF(^8)$ finite field operations, such finite field operations can be described in terms of more familiar polynomial operations. In this case, polynomial coefficients can be either bit values of 0 or 1, while the exponents within the polynomials refer to the various bit positions. For example, the decimal value 87 has the hexadecimal value 57 and a binary representation of 010111; with the polynomial representation of $X^6+X^4+X^2+X+1$. Generally, multiplication is implemented modulo an irreducible polynomial. As known to those skilled in the art, an irreducible polynomial is one that cannot be factored. In the case of $GF(2^8)$, an irreducible polynomial of order $2^8$ is used to assure the product can be represented in 8 bit.

In other words, in one embodiment described below, a modular multiplication operation (method) can simultaneously multiply byte pairs within coefficient and data value data stored devices to produce byte results, modulo and irreducible polynomials. Examples of irreducible polynomials are $X^8+X^4+X^3+X+1$ used by Rijndael and $X^8+X^4+X^3+X^2+1$. An example of modular multiplication for hex values of 83 and 57 using the following polynomial $X^8+X^4+X^3+X^2+1$ is:

$$83 \otimes 57 = (X^7 + X + 1)(X^6 + X^4 + X^2 + X + 1) \bmod (X^8 + X^4 + X^3 + X^2 + 1) \quad (1)$$
$$= X^5 + X^4 + 1$$
$$= 31 \text{ hex}.$$

The symbol is used for modular multiplication and the symbol is used for $GF(2^8)$ additions, which is a byte XOR operation.

A useful relation for $GF(2^8)$ finite field modular multiplication of two bytes is:

$$Y = GX = (GX_{low\ nibble})(GX_{high\ nibble}). \quad (2)$$

This relation indicates that the product of bytes $G_i$ and $X_i$ can be computed by computing the modular product of G with the "lower nibble: (four least significant bits) of X and the "high nibble" of X (four most significant bits) and adding the result together with an XOR operation.

In one of the embodiments described below, forward error control, or FEC, is used as an example to describe one or more SIMD modular multiplication methods performed using a selected memory access pattern. The most computationally intensive kernel of FEC is multiplication of a generator matrix by a matrix composed of input packets. Typically, the generator matrix is less than 10 kilobytes and will fit in a level one cache, while the packet matrix is one the order of 100 kilobytes and will fit in a level two cache, but not a level one cache. The data access pattern, as described in detail below, determines which matrix is loaded multiples times and which matrix is loaded only once. Vertical access of the packet matrix loads the small generator multiple times and the horizontal access load packet matrix multiple times, as is described in further detail below.

Figure 6:
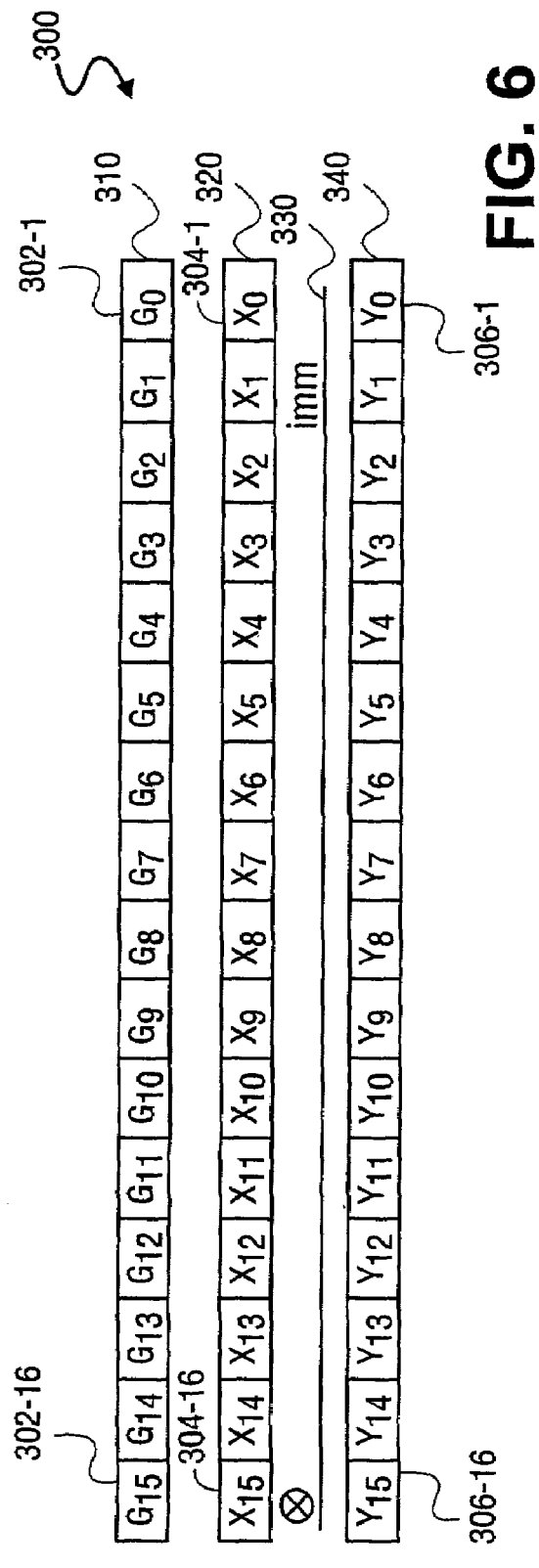
FIG. 6 depicts an SIMD modular multiplication operation in accordance with one embodiment of the present invention.

Referring now to FIG. 6, FIG. 6 depicts an SIMD modular multiplication operation, utilizing, for example, the following pneumonic:

$$PMODMUL\ XMM0, XMM1, iMM, \quad (3)$$

such as for example, modular multiplication operation 142, as depicted in FIG. 1. In the embodiment described, coefficient values 302 (302-1, . . . , 302-16) are loaded within a coefficient data storage device 310. Concurrently, data values 304 (304-1, . . . , 304-16) are loaded within a data value data storage device 320. The loading of the data and coefficient values is performed according to a selected data access pattern, as described in further detail below. In one embodiment, data access pattern selection is based on an instruction execution time and a data access time to determine the most efficient possible implementation of a data communications processing operation, such as for example, forward error control coding, encryption or the like.

As illustrated with reference to FIG. 6, corresponding byte values (302 and 304) within the registers (310 and 320) are simultaneously multiplied modulo and an irreducible polynomial (not shown) contained in register iMM 330 to form a plurality of byte result values 306 (306-1, . . . 306-16), which are stored in a result data storage device 340. As illustrated, the various parameters (XMM0, XMM1 and iMM) of the modular multiplication instruction may refer to 128 bit memory locations, as well as register locations. In one embodiment, the modulus contained in register iMM 330 is a 9-bit value. Some implementations may represent the third operand with 9 bits. However, as all valid modulus for $GF(2^8)$ are irreducible polynomials of order $2^8$, those skilled in the art will recognize that other implementations may use a byte representation as X8+iMM for the modulus. In this embodiment, the lower 8 bits are explicitly specified in the immediate (iMM) register 330.

Accordingly, utilizing the SIMD modular multiplication instruction 142, as depicted with reference to FIG. 6, corresponding values (302 and 304) may be simultaneously multiplied within SIMD registers (310 and 320). Generation of the various byte result values (306) is performed, in one embodiment, by performing shift operations in order to multiply the byte values (right shifting the byte values) and performing division utilizing the modulo value (performing a left shift according to the modulo value) to accomplish division without leading to overflow. In conventional binary arithmetic, multiplication is performed by computing products of a number times appropriate powers of two (2) and adding the products. For example, binary multiplication of 1001 by 1011 can be computed by adding the products of 1001 times 0001, 10001 times 0010, which is multiplication 2, and 1001 times 1000. Multiplication by 1000 is computed by multiplying 1001 by 0010 three times because 1000=8 and 8=2×2×2.

Likewise, implementation of modular multiplication requires a method for computing addition, and a method for computing the modular product of a number times 2, (2*x mod(Y)). Modular addition is computed with the XOR operation. However, modular multiplication in software is computed by shifting a value (X) left one bit, placing a zero in the LSB (least significant bit) of X, removing the MSB (most significant bit) of X, and conditionally performing an XOR operation on the shifted result of X with Y if the shifted out bit is one. The left shifting operation, followed by a conditional XOR, sometimes referred to as xtime, can be implemented in dedicated hardware with 4 XOR operations. A hardware implementation of modular multiplication is similar to conventional binary multiplication except that XOR replaces addition and conditional XOR replaces multiplication by 2. However, a hardware modular multiplication implementation might be even simpler than a conventional multiplication implementation since carry values generated by the products are ignored.

Figure 7:
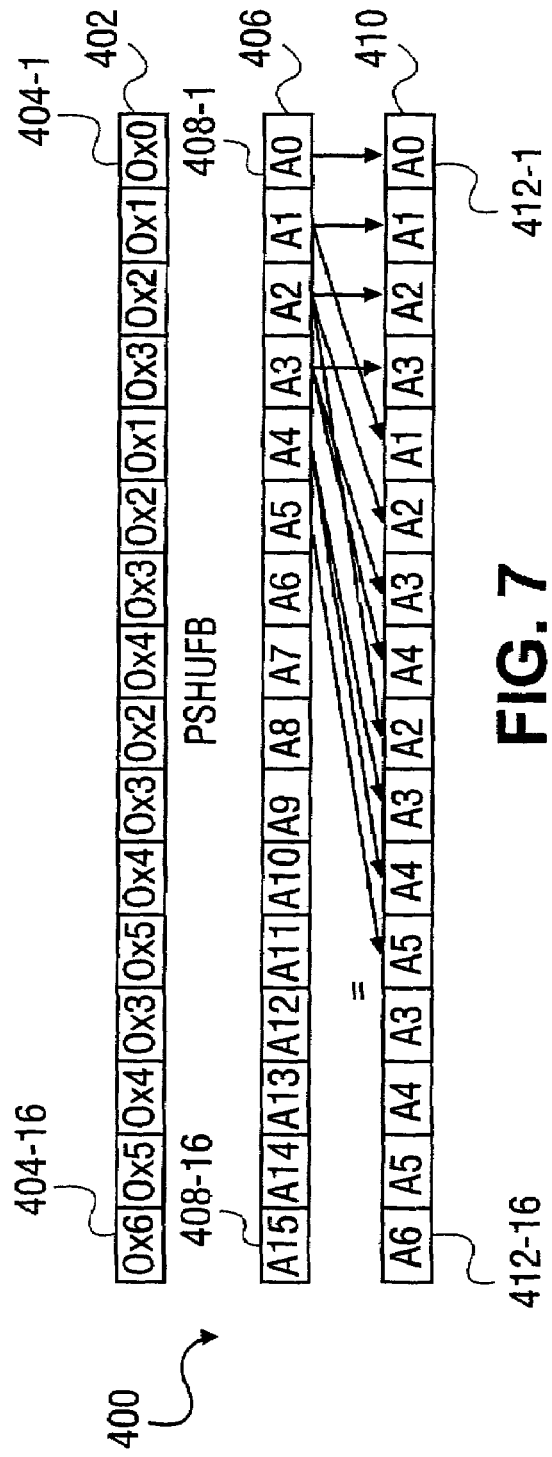
FIG. 7 depicts a byte shuffle operation utilizing various embodiments of the present invention to implement SIMD 16-byte look-up table modular multiplication, in accordance with one embodiment of the present invention.

In accordance with a further embodiment of the present invention, various computing environments will not include a modular multiplication instruction. However, within such environments, one embodiment of the present invention describes an efficient way to arrange data for all appropriate data sizes within a computing architecture. As depicted with reference to FIG. 6, an embodiment of the present invention includes a byte shuffle instruction (PSHUFB) 146, as depicted with reference to FIG. 7. The byte shuffle operation 146 orders data sizes which are larger than bytes by maintaining the relative position of bytes within the larger data during the shuffle operation. In addition, the byte shuffle instruction 146 can change the relative position of data in a SIMD register and can also duplicate data.

Referring again to FIG. 7, the data 408 (408-1, . . . , 408-16) is organized within a destination data storage device 410, which in one embodiment can be the same source data storage device 406, utilizing data mask 404 (404-1, . . . , 404-16) to specify the address where the respective data elements 408 are stored in the destination register 410. As described below, in one embodiment, the arrangement of the mask data 404 is based on the desired data communications processing operation, which may include for example, forward error control coding, encryption or the like. As such, utilizing a data shuffle operation, the present invention implements an embodiment wherein modular multiplication is implemented utilizing two 16-byte tables accessed by the byte shuffle operation.

Figure 8A:
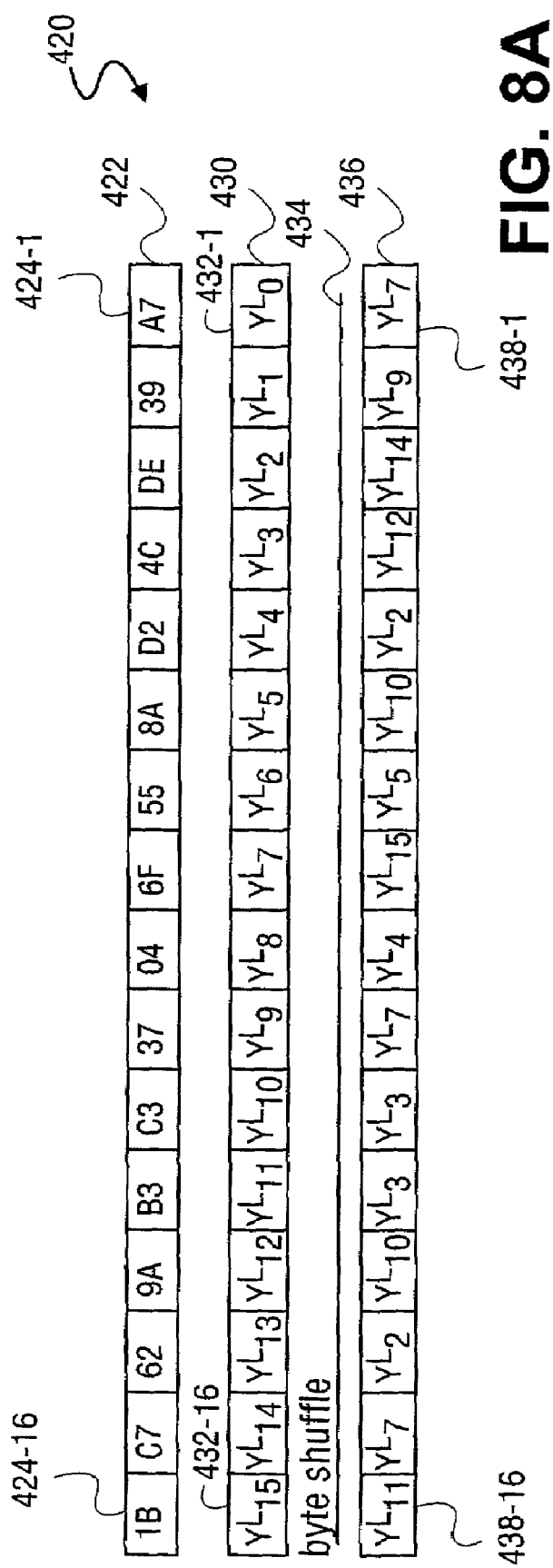
FIGS. 8A-8C depict block diagrams illustrating SIMD 16-byte look-up table modular multiplication, in accordance with one embodiment of the present invention, utilizing byte shuffle operation, as depicted with reference to FIG. 7.

In one embodiment depicted with reference to FIG. 8A, the PSHUFB instruction 146 is used to implement a method for computing the modular product of $G_i$ and $X_i$ ($G_iX_i=Y_i$), which refer to various coefficient and data values using the relationship:

$$G_iX_i=(G_iX_{i\ low\ nibble})(G_{iXi\ high\ nibble})=Y^i_{iY}{}^h_{i=Yi}. \quad (4)$$

In one embodiment, the coefficient value $G_i$ is a constant value that is to be applied to each data value 424 (424-1, . . . , 424-16) (see equation (4)) within a source data storage device 422 (FIG. 8A). Accordingly, all values of the coefficient $G_i$ (G0-G15) of equation (4) are equal. In the embodiment described in FIG. 8A, a hexadecimal representation of the data values 424 is illustrated wherein the data values 424 are stored as the byte values. Accordingly, 16 different byte modular product values ($Y^L/Y^H$) are generated for each of the four least significant bits (LSB) ("low nibble") (432(432-1, . . . , 432-16)) ($X_{i\ low\ nibble}$ 432) and the four most significant bits (MSB) ("high nibble") (444 (444-1, . . . , 444-16)) ($X_{i\ high\ nibble}$ 444) of the data values 424. Consequently, the low nibble $X_{i\ low\ nibble}$ 432 and the high nibble $X_{i\ high\ nibble}$ 444 of the data values 424 can be utilized to shuffle the coefficient values 432/444 (FIGS. 8A/8B) within a coefficient data storage device 430/442 (FIGS. 8A/8B) with the result stored in a result data storage device 436.

As a result, the look-up table approach calculates the 16 different possible modular product result values for the coefficient and loads each of the values 432/444 (FIGS. 8A/8B) ($Y^l_i/Y^H_i$) within a coefficient data storage device 430/442. Referring again to FIG. 8A, the input data values 424 are stored within the data storage device 422. In addition, low nibble (LSB) modular product result values $Y^L_i$ are stored within coefficient date storage device 432. Consequently, a byte-shuffle operation is performed and initially selects the four least significant bits (low nibble) 434 of each input data value 424 and simultaneously order the modular product result values 432 ($Y^L_i$) within the coefficient data storage device 430 and store the re-order result values 432 within a result data storage device 436.

Figure 8B:
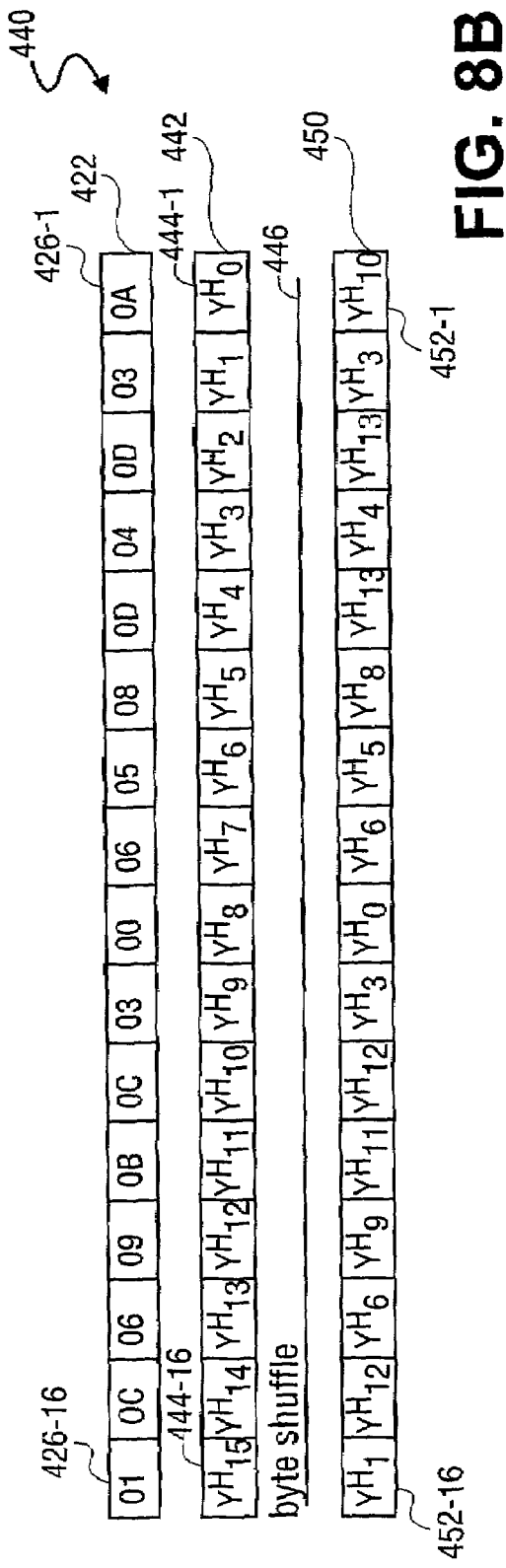
Figure 8C:
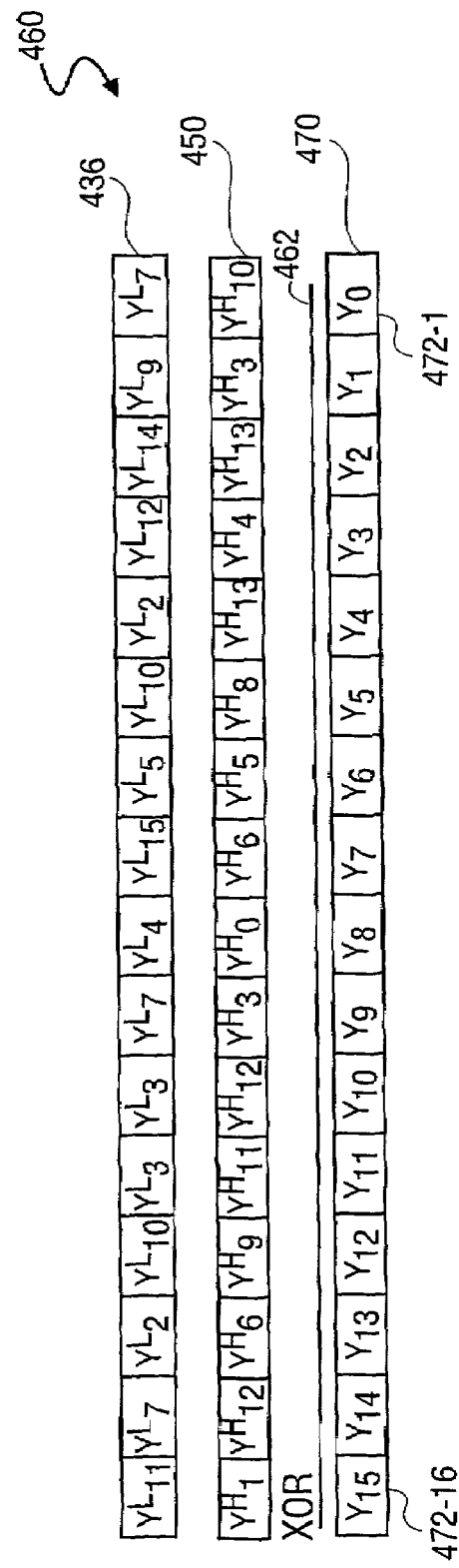

Next, as illustrated with reference to FIG. 8B, each data value 424 within the data storage device 422 would be right-shifted to remove the four least significant bits (low nibble) 434. In addition, high nibble (MSB) modular product result values $Y^H_i$ are stored within coefficient date storage device 442. Next, the byte shuffle operation shuffles the modular product result values data 426 within the coefficient data storage device 442 and store the re-ordered result values in a result data storage device 450. Finally, as illustrated with reference to FIG. 8C, an XOR operation 462 would simultaneously combine the result values 438/452 (FIGS. 8A/8B) within the result data storage device 436 and the result data storage device 450 and store the results within the result data storage device 470.

In the embodiment described, the shuffle operation automatically shuffles data within a specified register according to the four least significant bits (low nibble) of the respective data values. However, those skilled in the art will recognize that various implementations may be provided in order to achieve the byte shuffle operation described herein, while remaining within the scope of the present invention. As described in further detail below, certain data access operations will require multiplication of a coefficient value by a plurality of data values, such as for example, horizontal data access to achieve forward error control coding. As such, a duplicate coefficient value would be stored in each value of the coefficient matrix in order to comply with the condition of the constant coefficient value. Alternatively, modular multiplication may be performed using a scalar look-up table approach, as illustrated with reference to FIG. 1 instruction 150.

As described above, the data communications processing operations, such as for example, forward error control coding, or encryption, often require matrix multiplication of a large data set. As the data sets increase in size, memory access time can become a significant performance factor. Accordingly, one embodiment of the present invention provides a criterion to select a data access implementation which considers the amount of memory access in their inner loop of the algorithm with respect to the available cache in the system. Accordingly, in one embodiment, the selected data access pattern is chosen in order to provide minimal memory access in an inner loop of the data communications processing operation to achieve high utilization of the processor core.

Referring now to FIGS. 9A and 9B, FIGS. 9A and 9B show the comparison of memory access for a horizontal access pattern 500 and vertical access patterns 550 utilizing a matrix modular multiplication algorithm as described herein. As depicted with reference to FIG. 9A, the horizontal access method multiplies the generator (coefficient) matrix 520 by an input data packet 530 to achieve an output data packet 510. The input data packets (Y') 530 contains k rows of packets that are p columns in length, while the generator matrix 520 contains k' rows and k columns. In addition, the result of the modular multiplication operation generates an output packets 510, which contains k' rows of output packets that are p columns in length. Accordingly, for the horizontal access method depicted in FIG. 9A, the inner loop of the algorithm generates one output packet (1×p) 512 using a row of matrix $G'^{-1}$ 522 and all the k input packets Y' 530 of length p. This is repeated for k' output packets and X' 510.

Referring now to FIG. 9B, operation of the modular multiplication utilizing a vertical access 550 is illustrated. In one embodiment, an operation width of c is selected for the modular multiplication, which in one embodiment is usually the width of a cache line (see solid shapes in FIG. 9B). As a result, the very inner loop of the algorithm, creates the byte output for one row of matrix $G'^{-1}$ 520 and k partial rows of input with width c 580. This is repeated for all k' rows in matrix $G'^{-1}$ 520 to generate k' partial output packets with c bytes for each packet 562, while the same k partial rows of input 580 are reused. This is shown by the various shading patterns in FIG. 9B.

TABLE 1

LOOP AND MEMORY COUNTS FOR HORIZONTAL ACCESS METHODS:

| LoopA {k'} | |
|---|---|
| Input: | k (memory G'-1), k x p (memory Y') |
| Intermediate: | {k} x p (memory) |
| Output: | p (memory) |
| Output of LoopA: | k' of {p} |

TABLE 2

LOOP AND MEMORY COUNTS FOR VERTICAL ACCESS METHODS:

| LoopA {p/c} | |
|---|---|
| LoopB {k'} | |
| Input: | k (memory G'-1), k x c (memory Y') |
| Intermediate: | c (registers) |
| Output: | c (memory) |
| Output of LoopB: | k' of {c} |
| Output of LoopA: | p/c of {k' x c } |

As illustrated by Tables 1 and 2, it can be seen that the total memory access for the inner loop of the horizontal access method is k+(k*p)+p, while the total memory access for the vertical access method is k'*k+(k*c). It should be noted that in the horizontal access method, the intermediate (accumulate) data of length p is accessed (read and write k'). In comparison, the vertical access method uses intermediate (accumnulate) data of one cache line c that can be kept in the registers. In various embodiments, this can make a difference for inner loop performance if the intermediate memory access of the horizontal access method cannot be hidden in the processor pipeline. In a typical FEC application, the following is generally the case:

$$p \gg kk > k'k \gg c \qquad (5)$$

For example, in a wireless application, P is about 15,000; K is about 100-150 and C is 32. Therefore, it is normally true that k+(k×p)+p≫k'×k+(k×c). Therefore, the vertical access method has minimal memory access in the inner loop and may be more appropriate for higher speed processors. However, in some cases, performance effects due to differences in computations for vertical and horizontal access may be greater than the effects due to memory access time.

TABLE 3

PSEUDO CODE FOR MODULAR MULTIPLY

SIMDmodulo multiply instruction:
PMODMUL R0,R1iMM//data in R0, coefficients in R1, modulus in iMM
SIMD 16-byte lookup table
PSHUFFLE R1, R0 //low nibble products R1, data in R0
PSHIFTRIGHT R0,4 //shift data 4 bits TABLE 3-continued

PSEUDO CODE FOR MODULAR MULTIPLY

PSHUFFLE R2, R0 //high nibble products R02 data in R0
PXOR R1, R2 //Finite field add low and high products
Scalar table lookup
LOAD R0, [R1 + R2]//table in R1, input data in R2

TABLE 4A

PSEUDO CODE K'XK BY KXP MATRIX MULTIPLY

Vertical data access pattern
Begin0:
SET R2 to zero//initialize running sum to zero
Begin1:
LOAD R0, [R3] //load data from data kxp matrix
LOAD R1, [R4]//load values from coefficient k'xk matrix
MODMUL R0, R1 //modular multiply with selected method
XOR R2, R0 //add modular product in R0 to running sum in R3
INCREMENT k index
GOTO Begin1 if not done in k
INCREMENT k' index
STORE [R5], R2 //store result sum of products
GOTO Begin0 if not done in k'
INCREMENT p index
GOTO Begin0 if not done in p

TABLE 4B

HORIZONTAL DATA ACCESS PATTERN

STORE [R5 + i], 0 initialize output array to zero (increment i)
Begin0:
LOAD R1, [R4]//load coefficient k'xk matrix address in R4
Begin1:
LOAD R0, [R3] //load packet data (kxp matrix) address in R3
LOAD R2, [R5] //load output in R5
MODMUL R0, R1//modular multiply with selected method
XOR R2, R0 //add product in R0 to output in R2
STORE [R5], R2
INCREMENT p index
GOTO Begin2 if not done in p
INCREMENT k index
GOTO Begin1 if not done in k
//begin a new output packet
INCREMENT k' index
GOTO Begin0 if not done in k'

As illustrated by Tables 3, 4A and 4B, the number of products computed by the matrix SIMD modular multiplication instruction method and small look-up table method equals the byte length of an SIMD register. The scalar method determines a single product. In addition to the instructions shown in Table 3, data loads required for each of the methods, as well as coefficient loads for the various methods and table loads for the small table look-up method are also required. Effects due to memory access time have a greater impact on performance for the modular multiplication instruction method than the small table look-up method due to the fact of the minimal number of instructions and the loading of a single register with the coefficients, whereas the small table method loads two registers with table values. In addition, the small table method requires a large generator metrics, which does not fit in a level one cache as easily as the generator matrix used by other methods.

TABLE 5

Number of instructions to compute 16 FEC
multiply-accumulate operations

| instruction | scalar | SIMD small tables | SIMD mod mult. |
|---|---|---|---|
| load | 48 | 2 | 2 |
| store | 16 | 1 | |
| XOR | 32 | 2 | 1 |
| byte shuffle | | 2 | |
| shift | | 1 | |
| register copy | | 2 | |
| modular multiply | | | 1 |
| total | 96 | 10 | 4 |

TABLE 6

Processing rate in M Bytes/speedup for different methods
for FEC matrix multiplication. Measurements are made on
a 1.7 Ghz P4. New modular multiplication and byte
shuffle instructions are replaced with existing
instructions whose latency and throughput are estimated
to be approximately equal to the new instructions.

| SIMD/ scalar | multiplication method | horizontal vertical | process rate M bytes/s | speedup |
|---|---|---|---|---|
| Scalar | 256-byte table | horizontal | 15.6 | 1.0 |
| Scalar | 256-byte table | vertical | 17.2 | 1.1 |
| SIMD | 16-byte table with shuffle | horizontal | 123.2 | 7.9 |
| SIMD | 16-byte table with shuffle | vertical | 112.3 | 72. |
| SIMD | modular multiply | horizontal | 173.2 | 11.1 |
| SIMD | modular multiply | vertical | 266.8 | 17.1 |

TABLE 7

Simulator computed speedup of FEC different SIMD instructions an
number of SIMD units. A perfect cache is assumed.

| multiplication method | horizontal/ vertical | SIMD units | speedup |
|---|---|---|---|
| scalar | vertical | 1 | 1 |
| scalar | vertical | 2 | 1 |
| 16-byte table with shuffle | vertical | 1 | 14 |
| 16-byte table with shuffle | vertical | 2 | 21 |
| modular multiply | vertical | 1 | 41 |
| modular multiply | vertical | 2 | 43 |

Consequently, speed-up shown in Tables 5, 6 and 7 for the vertical access pattern is significantly greater than the horizontal access pattern for the instruction method. However, the speed-up is comparable for both access patterns using the small table method, as illustrated by Table 6. A factor that increases the computation time of the vertical pattern approach relative to the horizontal pattern approach is that the tables are loaded in the inner loop in the vertical approach and in the middle loop in the horizontal approach, as illustrated by Tables 4A and 4B. Procedural methods for implementing embodiments of the modular multiplication methods described herein are now illustrated.

Operation

Figure 10:
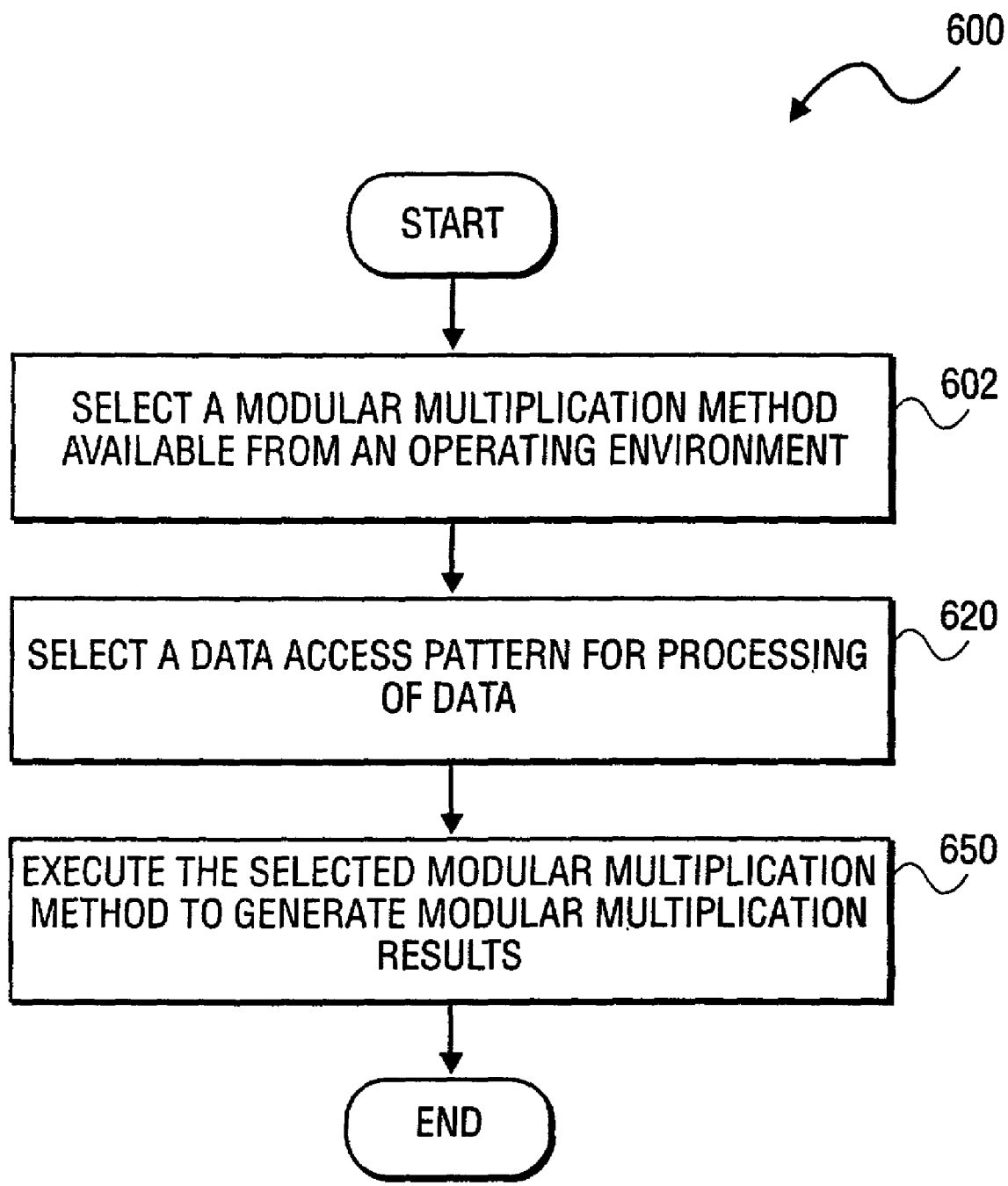
FIG. 10 depicts a flowchart illustrating a method for SIMD modular multiplication in accordance with the selected modular multiplication method and in accordance with one embodiment of the present invention.

Referring now to FIG. 10, FIG. 10 depicts a flowchart illustrating a method 600 for performing SIMD modular multiplication according to a selected data access pattern in accordance with one embodiment of the present invention. At process block 602, a modular multiplication method is selected from one or more modular multiplication methods available for an operating environment. In the embodiments described, the modular multiplication methods include SIMD modular multiplication and SIMD 16-byte look-up table modular multiplication.

Once selected, at process block 620, a data access pattern is selected for processing of data according to a data communications processing operation. The communications processing operations includes, for example, error control coding, encryption, image and data processing operations or the like. Selecting of data access pattern is illustrated with reference to FIGS. 9A and 9B. Finally, at process block 650, the selected modular multiplication method is executed to generate modular multiplication results from data access according to the selected data access pattern.

Figure 11:
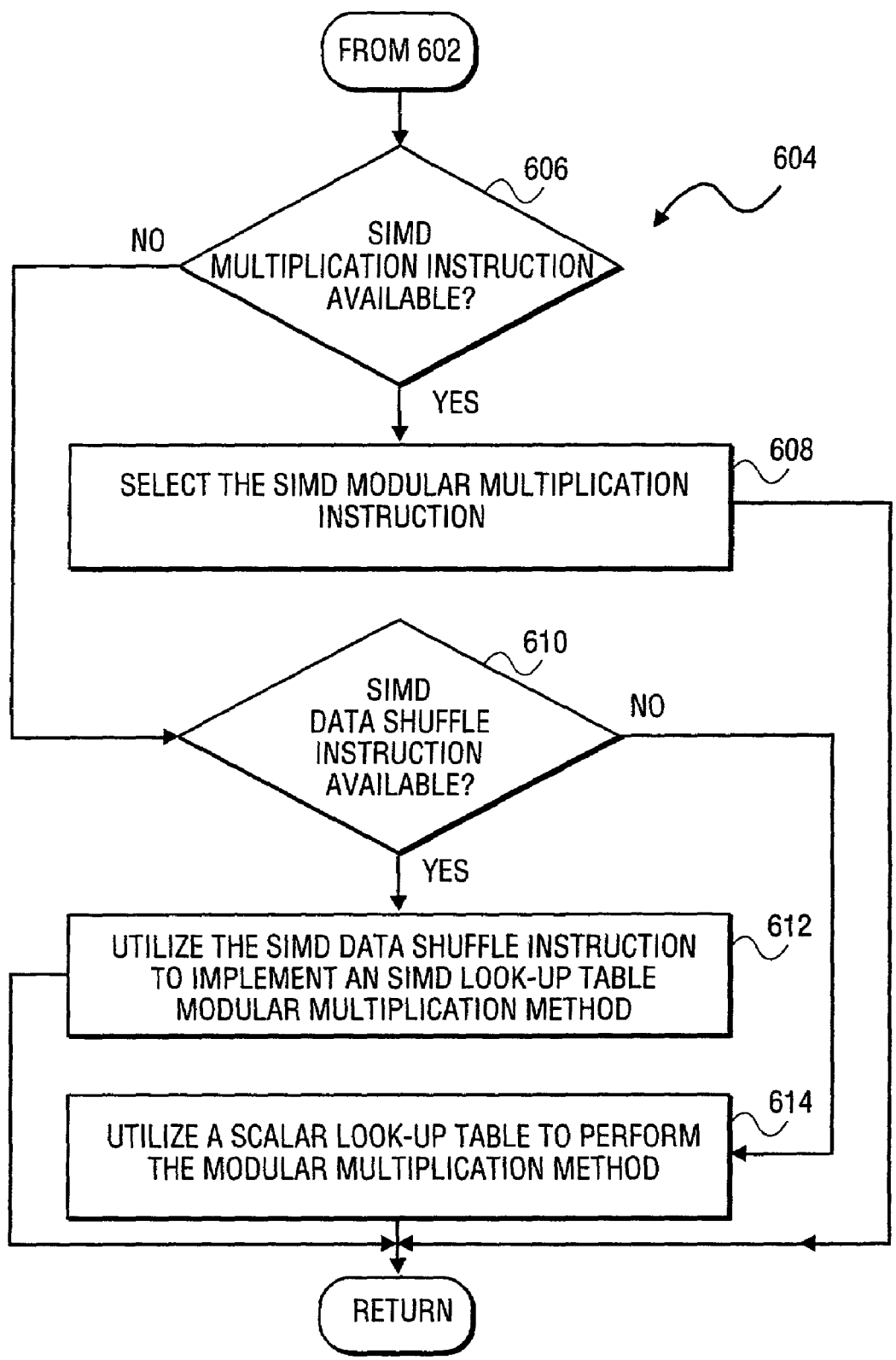
FIG. 11 depicts a flowchart illustrating an additional method for selecting a modular multiplication method available from an operating environment in accordance with one embodiment of the present invention.

Referring now to FIG. 11, FIG. 11 depicts a flowchart illustrating an additional method 604 for selecting a modular multiplication method available for an operating environment of process block 602, as depicted in FIG. 10. At process block 606, it is determined whether an SIMD modular multiplication instruction is available from the operating environment. When the modular multiplication method is available, at process block 608, the SIMD modular multiplication instruction is selected as the selected modular multiplication method.

Otherwise, at process block 610, it is determined whether the operating environment offers an SIMD data shuffle instruction. When a data shuffle instruction is available from the operating environment, the SIMD data shuffle instruction is utilized to implement an SIMD look-up table modular multiplication method as the selected modular multiplication method. Otherwise, at process block 614, modular multiplication is performed utilizing a scalar look-up table approach, such as for example, available utilizing conventional look-up table techniques as known to those skilled in the art.

Figure 12:
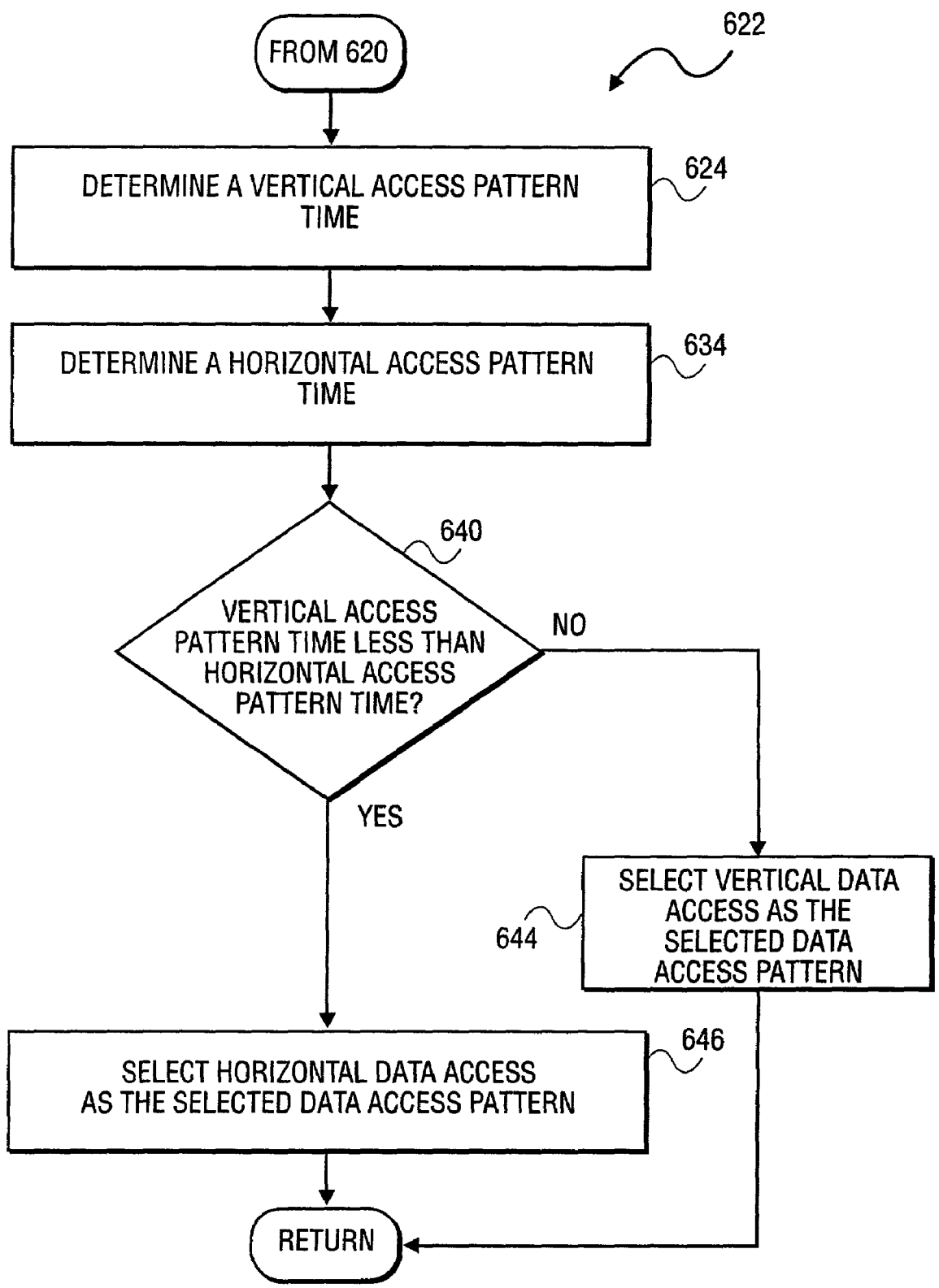
FIG. 12 depicts a flowchart illustrating an additional method for selecting the data access pattern according to a data communications processing operation, in accordance with a further embodiment of the present invention.

Referring now to FIG. 12, FIG. 12 depicts a flowchart illustrating an additional method 622 for selecting a data access pattern according to a data communications processing operation of process block 620, as depicted in FIG. 10. At process block 624, a vertical access pattern time is determined according to the data communications processing operation. Once determined, at process block 634, a horizontal access pattern time is determined according to the data communications processing operation. Next, at process block 644, it is determined whether the vertical access pattern time is less than the horizontal access pattern time. When such is the case, at process block 646, the vertical data access is selected as the selected data access pattern. Otherwise, at process block 648, horizontal data access is chosen as the selected data access pattern. In one embodiment, this is performed utilizing the data access pattern comparison, as illustrated with reference to FIGS. 9A and 9B.

Referring now to FIG. 13, FIG. 13 depicts a flowchart illustrating an additional method for determining the vertical access pattern time of process block 624, as depicted in FIG. 12. At process block 628, a vertical data access time is determined according to the data communications (data) processing operation. Next, at process block 630, a vertical instruction execution time is determined according to the data processing operation. Finally, at process block 632, the vertical data access time is combined with the vertical instruction execution time to form the vertical access pattern time.

Referring to FIG. 14, FIG. 14 depicts a flowchart illustrating an additional method 636 for determining the horizontal access pattern time of process block 634, as depicted in FIG. 12. At process block 638, a horizontal data access time is determined according to the data processing operation. Next, at process block 640, a horizontal instruction execution time is determined according to the data processing operation. Finally, at process block 642, the horizontal data access time is combined with the horizontal instruction execution time to form the horizontal access pattern time.

Figures 15, 16:
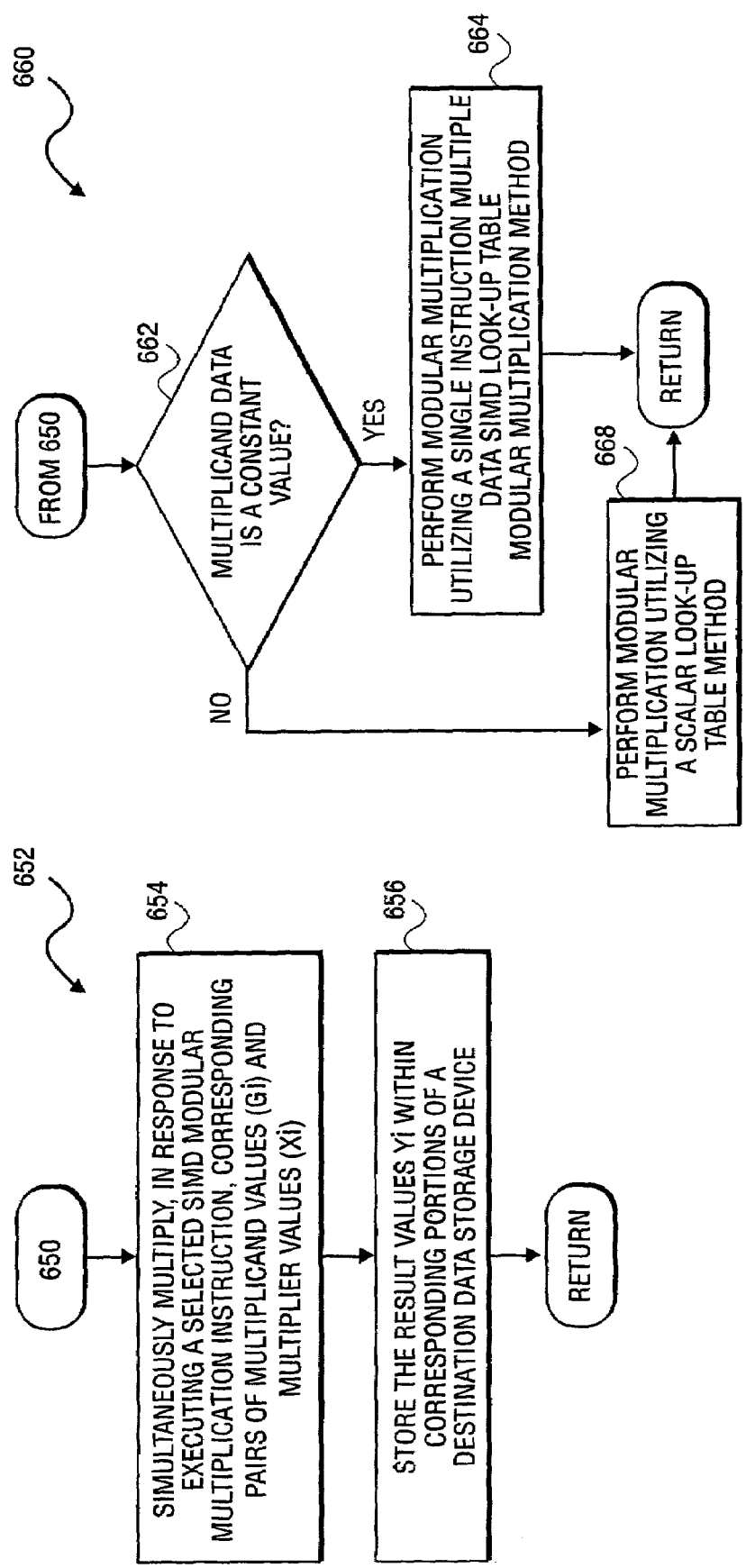
FIG. 15 depicts a flowchart illustrating an additional method for performing an SIMD modular multiplication instruction in accordance with one embodiment of the present invention.
FIG. 16 depicts a flowchart illustrating an additional method for executing a selected modular multiplication method in accordance with one embodiment of the present invention.

Referring now to FIG. 15, FIG. 15 depicts a flowchart illustrating an additional method 652 for executing operations of the selected modular multiplication method of process block 650, as depicted in FIG. 10. At process block 654, corresponding pairs of multiplicand values 302 ($G_i$) and multiplier values 304 ($X_i$) are simultaneously multiplied modulo an irreducible polynomial (iMM) 330 to form a plurality of result values 306 for example, as depicted in FIG. 6. In one embodiment, the corresponding pairs of multiplicand and multiplier values are byte values, which are multiplied simultaneously to produce byte results modulo an irreducible polynomial. Finally, at process block 656, the plurality of byte result values 306 are stored within corresponding portions of the destination data storage device 340, for example, as depicted with reference to FIG. 6.

Referring now to FIG. 16. FIG. 16 depicts a flowchart illustrating an additional method 660 for executing operations of the selected modular multiplication method of process block 650, as depicted in FIG. 10. At process block 652, it is determined whether multiplicand data accessed according to the data access pattern is a constant value. When such is the case, at process block 664, modular multiplication is performed utilizing an SIMD look-up table modular multiplication method. Otherwise, at process block 668, modular multiplication is performed utilizing the scalar look-up table method, utilizing for example, conventional look-up table techniques.

Figure 17:
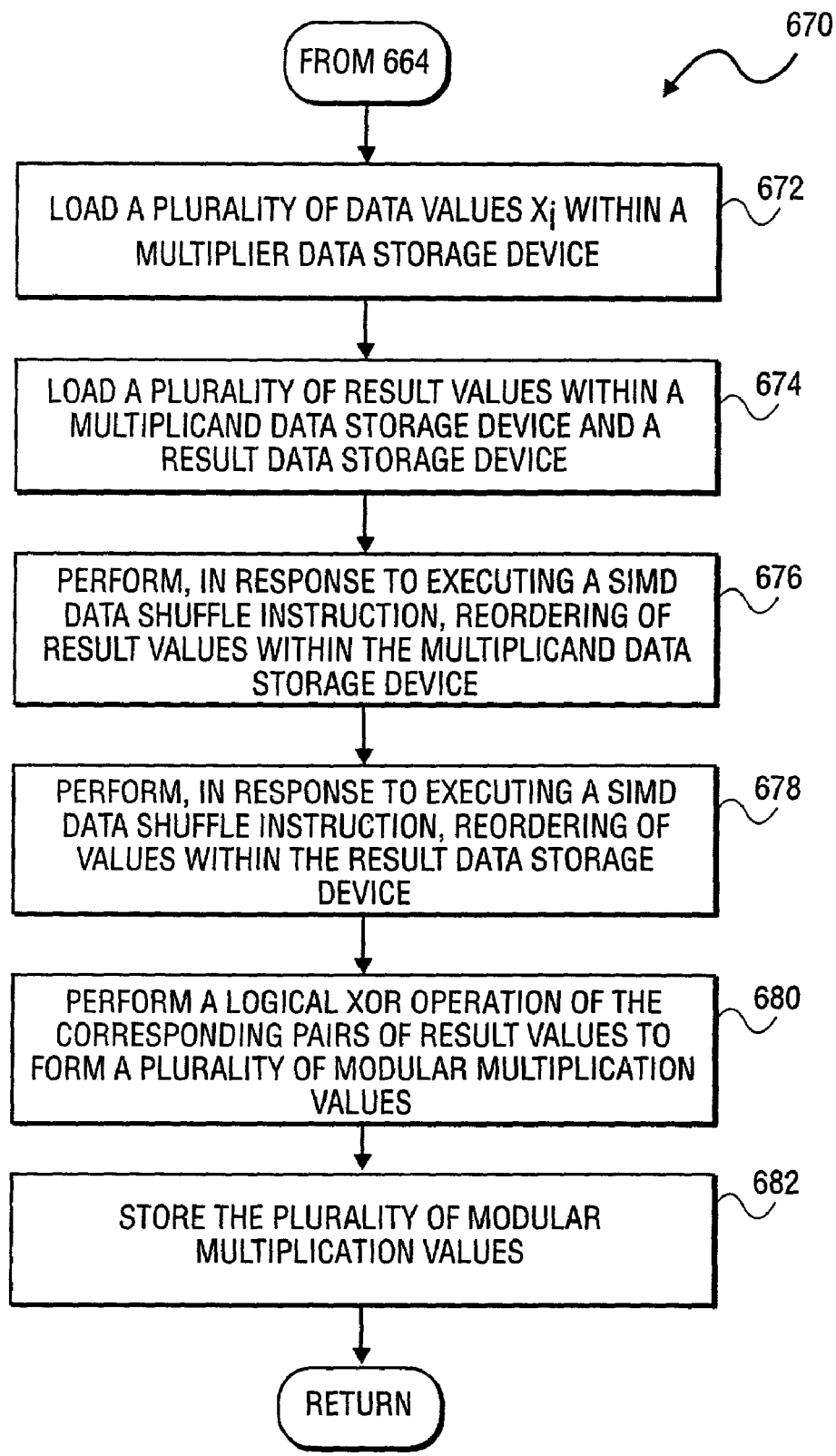
FIG. 17 depicts a flowchart illustrating an additional method for performing an SIMD modular multiplication look-up table method in accordance with a further embodiment of the present invention.

Referring now to FIG. 17, FIG. 17 depicts a flowchart illustrating an additional method 670 for performing SIMD modular multiplication look-up table method of process block 664, as depicted in FIG. 16. At process block 672, a plurality of data values 424 are loaded within a multiplier data storage device 422 (FIG. 8A) according to a data access pattern. Next, at process block 674, a plurality of pre-calculated result values 432 are loaded within a multiplicand data storage device 430 and a result data storage device 442 (FIG. 8B). Next, at process block 676, a data shuffle operation is performed to reorder result values within the multiplicand data storage device 436 according to a respective N least significant bits of each data value within the multiplier data storage device 422.

Next, at process block 678, values within the result data storage device 442 are reordered according to a respective M most significant bits of each respective data value within the multiplier data storage device 422. Next, at process block 680, a logical XOR operation is performed on corresponding pairs of result values within the multiplicand data storage device 436 and the result data storage device 450 to form a plurality of modular multiplication values 472 (see FIG. 8C). Finally, at process block 682, the plurality of modular multiplication values 472 are stored within corresponding portions of the result data storage device 470. In one embodiment, this is performed as depicted with reference to FIGS. 8A-8C, utilizing the data shuffle operation depicted with reference to FIG. 7.

Figure 18:
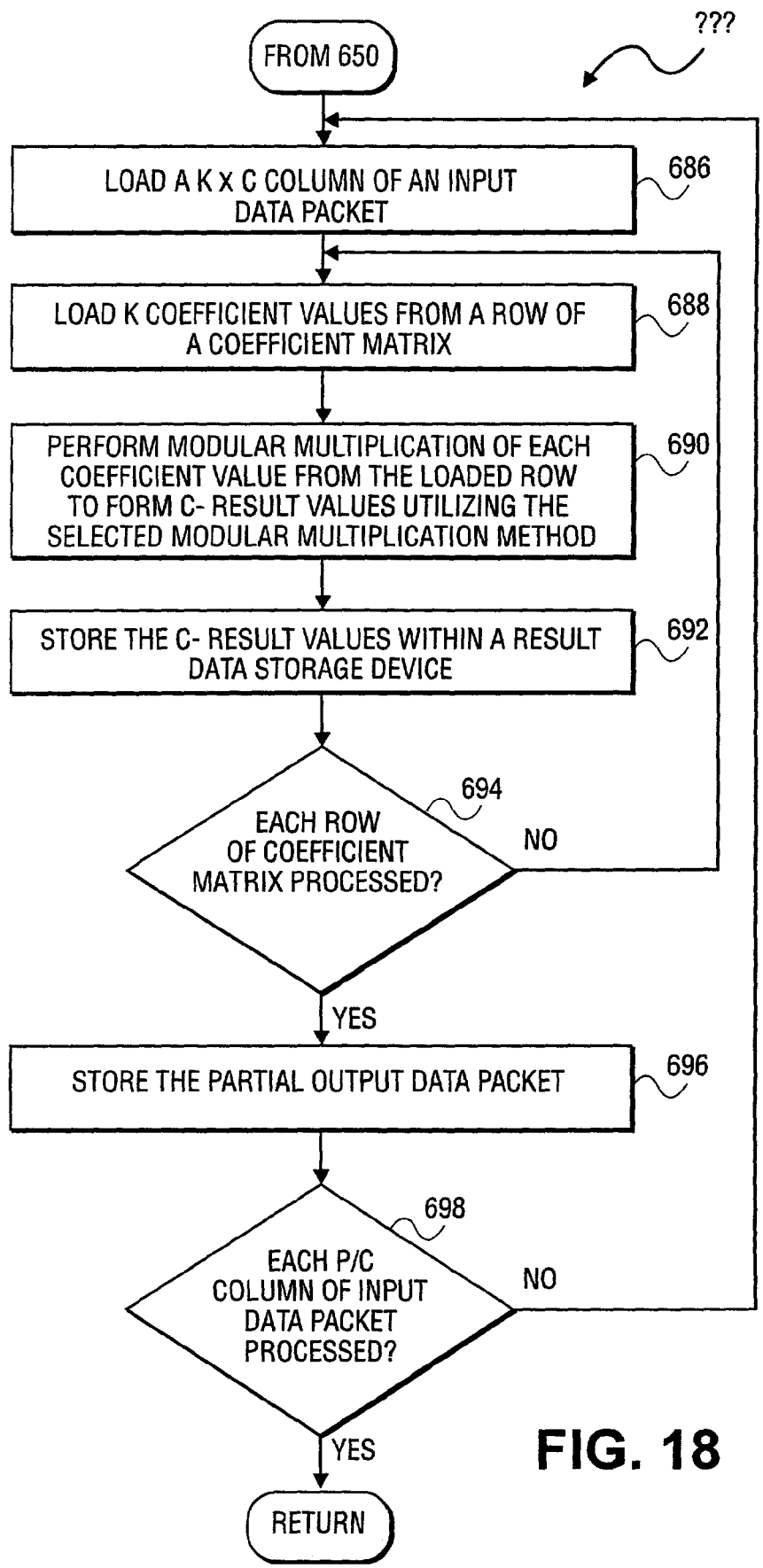
FIG. 18 depicts a flowchart illustrating an additional method for executing a selected modular multiplication method according to a selected data access pattern in accordance with the further embodiment of the present invention.

Referring now to FIG. 18, FIG. 18 depicts a flowchart illustrating an additional method 684 for executing operations of a selected modular multiplication method according to a selected data access pattern of process block 650 as depicted in FIG. 10. At process block 686, a k×c column 580 of an input data packet 530 is loaded within one or more multiplier data storage devices. Once loaded, at process block 688, k coefficient values from a row of a coefficient matrix are loaded within one or more multiplicand data storage devices.

Once the coefficient values are loaded, at process block 690, modular multiplication of each coefficient value for the row of k coefficient values 570 is performed with a corresponding kth row of the k×c input data column 580 to form c result values 560 utilizing the selected modular multiplication method. In one embodiment, this is performed as depicted with reference to FIG. 9B. Next, at process block 692, the c result values are stored within a result data storage device. At process block 694, process blocks 688-692 are repeated for each row of the coefficient matrix 520 to form a partial output packet 510. At process block 696, the partial output packet is stored. Finally, at process block 698, process blocks 686-696 are repeated for each k×c column 580 of the input data packet 530 to form an output data packet 510, as depicted in FIG. 9B.

Figure 19:
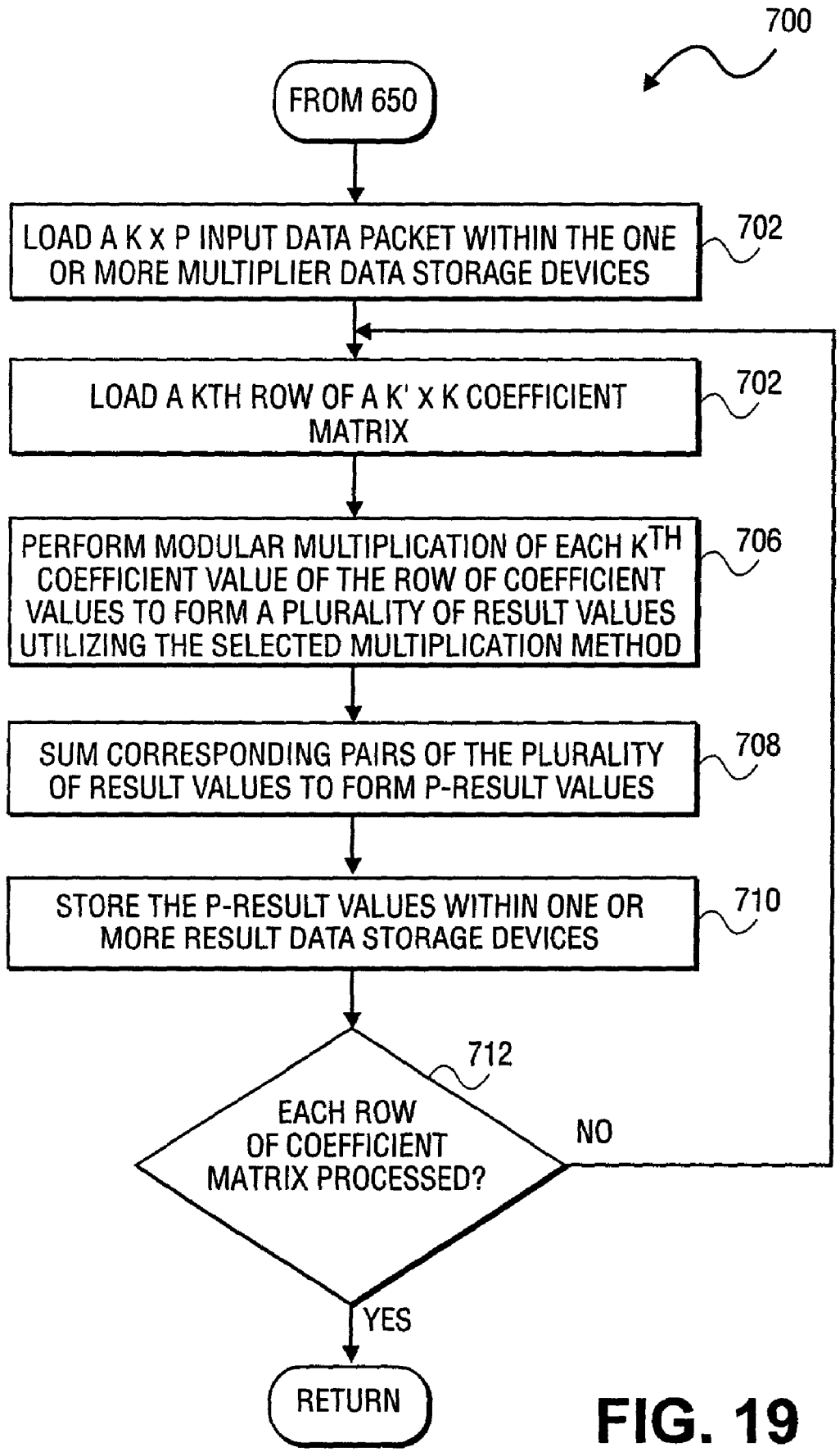
FIG. 19 depicts a flowchart illustrating an additional method for executing a selected modular multiplication method according to a selected data access pattern.

Referring now to FIG. 19, FIG. 19 depicts a flowchart illustrating an additional method 700 for executing operations of a selected modular multiplication method according to the selected data access pattern. In one embodiment, the selected data access pattern is a horizontal data access pattern, as depicted with reference to FIG. 9A. Accordingly, at process block 702, a k×p input data packet 530 is loaded within one or more multiplier data storage devices. Once loaded, a kth row 522 of a k'×k coefficient matrix 520 is loaded within a coefficient data storage device.

Once loaded, at process block 706, modular multiplication of each kth coefficient value of the row of k-coefficient values 522 is performed with each data value within a corresponding kth row of the input data packet 530 to perform a plurality of result values utilizing the selected modular multiplication method, for example, as depicted with reference to FIG. 9A. Once modular multiplication is performed, at process block 708, corresponding pairs of the plurality of result values are summed to form p result values 512 of a row of a partial output packet 510. Once the p result values 512 are generated, at process block 710, the p result values 512 are stored within, for example, one or more result data storage devices, system memory, a memory buffer or the like. Finally, at process block 712, process blocks 704-710 are repeated for each row of the coefficient matrix 520 to form an output packet 510 having k' rows of p result values, as depicted with reference to FIG. 9A.

Figure 20:
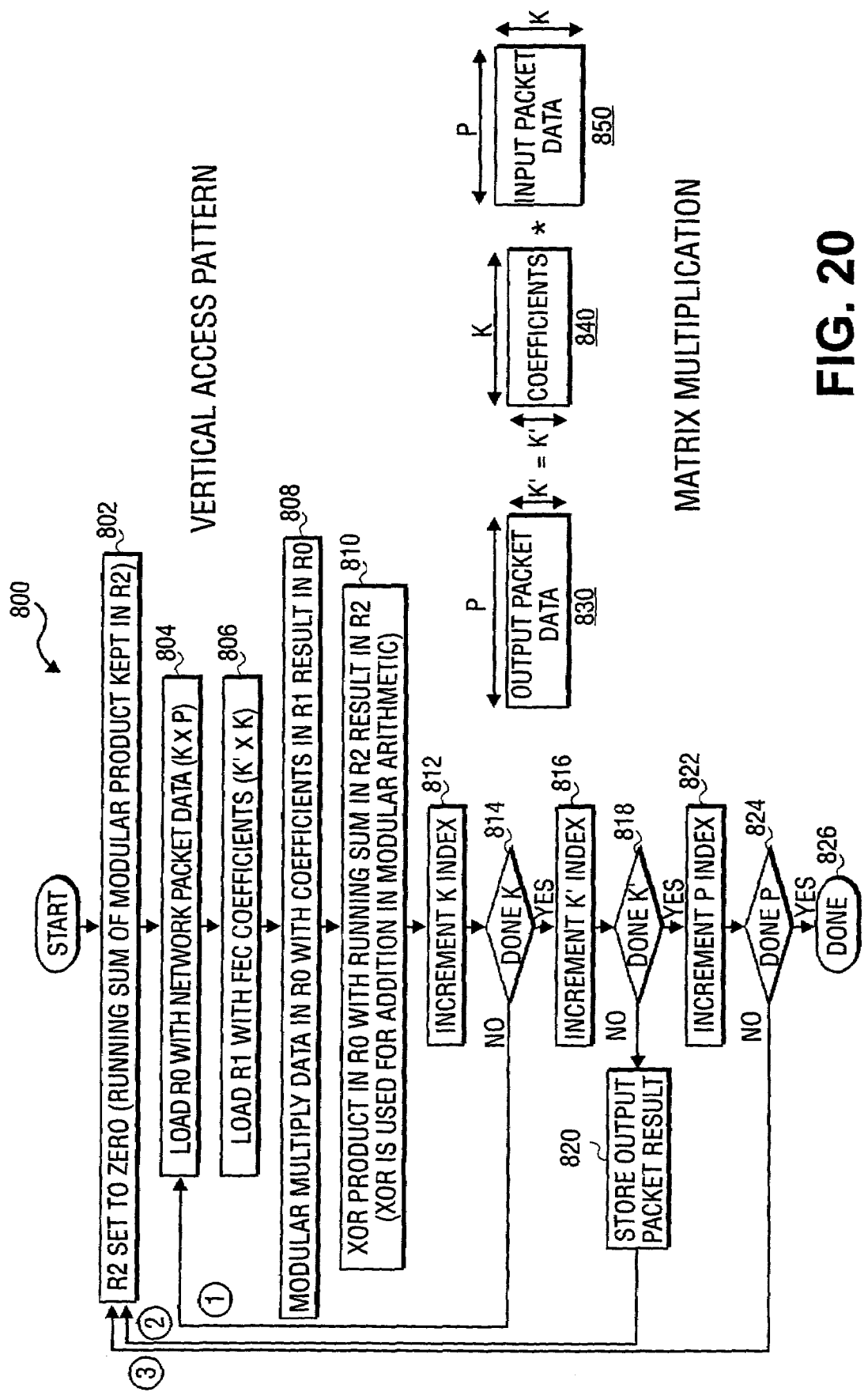
FIG. 20 depicts a flowchart illustrating a method for accessing input data according to a vertical access pattern and multiplying the selected input data with corresponding coefficient values according to a selected modular multiplication method in accordance with an exemplary embodiment of the present invention.

Referring now to FIG. 20, FIG. 20 depicts a flowchart illustrating a method 800 for processing an input data packet 850 according to a vertical access pattern and performing modular multiplication of the selected data with corresponding coefficient values according to a selected modular multiplication method, for example, as depicted with reference to FIG. 9B. At process block 802, a result data storage device ($R_2$) is set to zero. In one embodiment, device $R_2$ is utilized to keep a running sum of modular products. Once reset, at process block 804, a multiplier data storage device is loaded with a k×p input data packet 850.

In one embodiment, the input packet is stored in a level two memory buffer. Once loaded, at process block 806, a multiplicand data storage device ($R_1$) is loaded with a row of coefficient matrix 840. In one embodiment, the coefficient now is stored in a level one memory buffer. Once loaded, at process block 808, modular multiplication is performed of data in $R_0$ with coefficients in $R_1$ with the results stored in $R_0$. Next, at process block 810, an XOR operation product is generated in $R_0$ with the running sum stored in $R_2$. Once this product is stored, at process block 812, an index k is incremented. Next, at process block 814, process blocks 804-810 are repeated for each coefficient value within the loaded row of the coefficient matrix 840.

Next, at process block 816, a k' index is incremented. Once incremented, at process block 818, process blocks 820 and 802-816 are repeated for each row within coefficient matrix 840. Next, at process block 822, a p index is incremented. Once incremented, at process block 824, process blocks 802-822 are repeated for each p/c column of input data packet 850. Once each p/c input data packet column is processed, the method terminates at process block 826 to form output data packet 830

The method depicted with reference to FIG. 20 performs the data communications processing operation utilizing vertical data access, as depicted in FIG. 9B, by performing the pseudocode depicted in Table 4A. As will be recognized by those skilled in the art, the various data storage devices utilized to store the data may include SIMD registers, data/memory buffers, such as cache memory, as well as other temporary data storage devices to avoid memory access to main memory in order to maintain any running sums.

Figure 21:
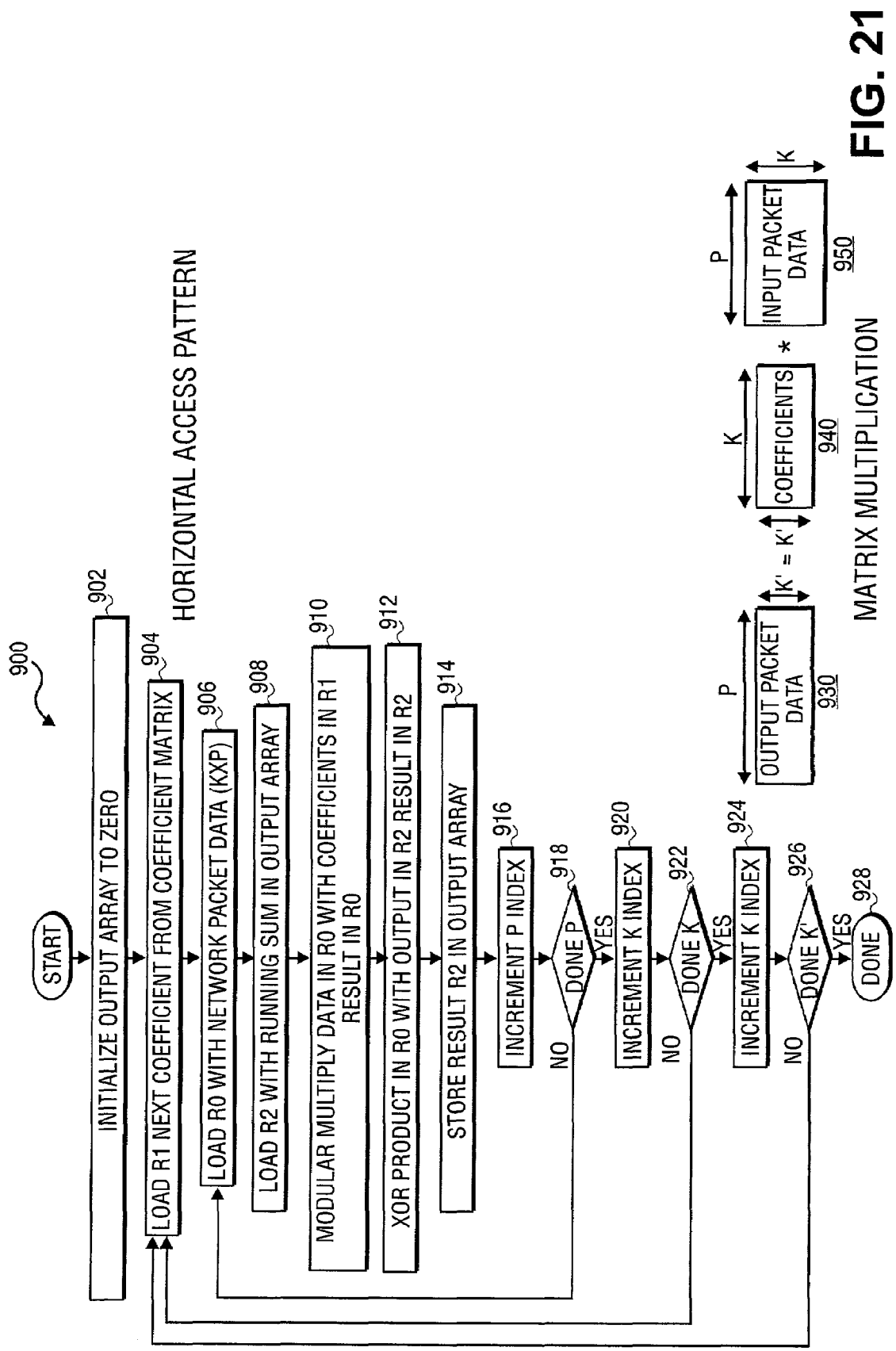
FIG. 21 depicts a flowchart illustrating a method for selecting data from an input data packet according to a horizontal access pattern and performing modular multiplication of the selected data with corresponding coefficient values according to a selected modular multiplication method in accordance with an exemplary embodiment of the present invention.

Finally, referring to FIG. 21, FIG. 21 depicts a flowchart illustrating an additional method for accessing input data according to a horizontal data access pattern and performing modular multiplication of the selected data with corresponding coefficient values according to a selected modular multiplication method, for example, as depicted with reference to FIG. 9A. At process block 902, an output array is initialized to zero. Next, at process block 904, a multiplicand data storage device ($R_1$) is loaded with a 1×k row of coefficient matrix 840. In one embodiment, the input packet is stored in a level two memory buffer. Next, at process block 906, a multiplier data storage device ($R_0$) is loaded with input data packet 850. In one embodiment, the coefficient now is stored in a level one memory buffer.

Once loaded, at process block 908, a result data storage device ($R_2$) is loaded with the sum contained within the output array. Once loaded, at process block 910, modular multiplication of data in $R_0$ is performed with coefficients in $R_1$ with the results stored in $R_0$. Once performed, at process block 912, an XOR operation of a plurality of products stored in the $R_0$ device is combined with the sum in the $R_2$ result data storage device with the result of the XOR operation stored in the $R_2$ device. Next, at process block 914, the result values in $R_2$ are stored in the running sum array. Once stored, at process block 916, a p index is incremented.

Once the p index is incremented, at process block 918, process blocks 904-916 are repeated for each data value within the input data packet 850 to form p result values which are contained in output array. Next, at process block 920, a k index is incremented. Once incremented, at process block 922, process blocks 904-920 are repeated for each row of coefficient matrix 520. Once performed, at process block 924, a k index is incremented. Finally, at process block 926, process blocks 904-924 are repeated for each row within coefficient matrix 520 to form output data packet 930. In one embodiment, the data communications processing operation is performed, as depicted in FIG. 9A, utilizing pseudocode, illustrated with reference to Table 4B.

Accordingly, utilizing the teachings of the present invention, modular multiplication can be performed utilizing data level parallelism in order to speed up modular multiplication as compared to conventional look-up table methods. This approach is extremely beneficial within forward error control as well as encryption algorithms, including image and video coding algorithms, as well as resorting last packets in communications data in storage systems, such as redundant array of independent disk (RAID) systems. The methods and embodiments described herein can improve the efficiency of virtually any image, video, wireless communications or like operation, which perform modular multiplication. Moreover, embodiments described herein enable the selection of a data access pattern according to the data communications processing operation in order to achieve the highest possible data processing efficiency.

Alternate Embodiments

Several aspects of one implementation of the modular multiplication instruction for providing SIMD modular multiplication for video/image data have been described. However, various implementations of the modular multiplication instruction provide numerous features including, complementing, supplementing, and/or replacing the features described above. Features can be implemented as part of a processor or as part of an image/video processing system in different implementations. In addition, the foregoing description, for purposes of explanation, used specific nomenclature to provide a thorough understanding of embodiments of the invention. However, it will be apparent to one skilled in the art that the specific details are not required in order to practice the embodiments of the invention.

In addition, although an embodiment described herein is directed to a modular multiplication instruction, it will be appreciated by those skilled in the art that the embodiments of the present invention can be applied to other systems. In fact, systems for encryption and error control coding utilizing modular multiplication are within the embodiments of the present invention, without departing from the scope and spirit of the embodiments of the present invention. In addition, embodiments of the present invention encompass other finite fields in addition to GF ($2^8$) for bytes. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The embodiments of present invention provides many advantages over known techniques. One embodiment of the present invention includes the ability to speed up modular multiplication for finite fields, such as, for example, GF ($2^8$). In one embodiment, the present invention describes two SIMD modular multiplication methods and shows how to select between the two methods. In one embodiment, the first method utilizes a new, special purpose SIMD modular multiplication instruction. In accordance with this embodiment, a second method provides a general purpose byte shuffle instruction that is utilized to implement SIMD modular multiplication, utilizing two 16-byte tables that are stored in a 128-bit register. The byte shuffle instruction is used for ordering data for operations, such as filtering, in order to enable shuffling of values within the two 16-byte tables in order to form a final modular multiplication value.

Accordingly, the modular multiplication, as taught by various embodiments of the present invention, may be applied to matrix multiplication, which is utilized by various encryption, as well as forward error control (FEC) algorithms. Finally, one embodiment of the present invention describes a method for determining and selecting a desired data access pattern. In one embodiment, execution times are utilized in order to determine whether data should be accessed in a vertical manner or in a horizontal manner, depending on the type of communications or encryption algorithms, which is currently being performed.

Having disclosed exemplary embodiments and the best mode, modifications and variations may be made to the disclosed embodiments while remaining within the scope of the invention as defined by the following claims.

What is claimed is:

1. A method comprising:
   determining a vertical data access pattern time according to a data processing/communication operation;
   determining a horizontal data access pattern time according to the data processing/communication operation;
   selecting one of a vertical data access pattern and a horizontal data access pattern as a selected data access pattern that reduces a data access pattern time required to compute a selected modular multiplication operation available from an operating environment according to the data processing/communication operation;
   accessing of data from an input data packet stored in memory according to the selected data access pattern for the data processing/communication operation;
   executing the selected modular multiplication operation to generate modular multiplication results for the data from the input data packet accessed from memory according to the selected data access pattern; and
   generating an output data packet corresponding to the data processing/communication operation according to the generated modular multiplication results in a reduced amount of time.

2. The method of claim 1, wherein selecting the data access pattern further comprises:
   determining whether a single instruction multiple data (SIMD) modular multiplication instruction is available from the operating environment;
   when the SIMD modular multiplication instruction is available from the operating environment, selecting the SIMID modular multiplication instruction as the selected modular multiplication method;
   otherwise, determining whether an SIMD data shuffle instruction is available from the operating environment;
   when the SIMD data shuffle instruction is available from the operating environment, utilizing the SIMD data shuffle instruction to implement an SIMD look-up table modular multiplication method; and
   otherwise, utilizing a scalar look-up table to perform the modular multiplication method.

3. The method of claim 1, wherein selecting the data access pattern further comprises:
   when the vertical data access pattern time is less than the horizontal data access pattern time, selecting vertical data access as the selected data access pattern; and
   otherwise, selecting horizontal data access as the selected data access pattern.

4. The method of claim 3, wherein determining the vertical access pattern time comprises:
   determining a vertical data access time according to the data processing operation;
   determining a vertical instruction execution time according to the data processing operation; and
   combining the vertical data access time with the vertical instruction execution time to form the vertical access pattern time.

5. The method of claim 3, wherein determining the horizontal access pattern time comprises:
   determining a horizontal data access time according to the data processing operation;
   determining a horizontal instruction execution time according to the data processing operation; and
   combining the horizontal data access time with the horizontal instruction execution time to form the horizontal access pattern time.

6. The method of claim 1, wherein executing the selected modular multiplication operation further comprises:
   simultaneously multiplying, in response to executing a selected a single instruction multiple data (SIMD) modular multiplication instruction, corresponding pairs of multiplicand values ($G_i$) and multiplier values ($X_i$) according to the following equation:

$$G_i \otimes X_i = Y_i \text{ modulo } M_i,$$

wherein symbol $\otimes$ refers to a modular multiplication operation, Y1 refers to multiplication result values and $M_i$ refers to one or more modulo values; and
   storing the result values Y, within corresponding portions of a destination data storage device.

7. The method of claim 1, wherein executing the selected modular multiplication operation further comprises:
   determining whether multiplicand data accessed according to the data access pattern is a constant value;
   when the accessed multiplicand data is a constant value, performing modular multiplication utilizing a single instruction multiple data a single instruction multiple data (SIMD) look-up table modular multiplication operation; and
   otherwise, performing modular multiplication utilizing a scalar look-up table operation.

8. The method of claim 7, wherein performing the modular multiplication utilizing the a single instruction multiple data (SIMD) modular multiplication look-up table operation further comprises:
   loading a plurality of data values $X_i$ within a multiplier data storage device;
   loading a plurality of result values within a multiplicand data storage device and a result data storage device;
   performing, in response to executing a SIMD data shuffle instruction, reordering of result values within the multiplicand data storage device according to a respective N-least significant bits of each data value within the multiplier data storage device;
   performing, in response to executing a SIMID data shuffle instruction, reordering of values within the result data storage device according to a respective M-most significant bits of each respective data value within the multiplier data storage device;
   performing a logical XOR operation of the corresponding pair of result values within the multiplicand data storage device and the result data storage device to form a plurality of modular multiplication values; and storing the plurality of modular multiplication values within corresponding positions of the result data storage device.

9. The method of claim 1, wherein executing operations of the selected modular multiplication operation according to the selected data access pattern further comprises:

loading a k×c column of the input data packet within one or more multiplier data storage devices, where k and c are integer values;

loading k coefficient values from a row of a coefficient matrix within one or more multiplicand data storage devices;

performing modular multiplication of each coefficient value from the row of k-coefficient values with a corresponding kth row of the k×c input data column to form c result values utilizing the selected modular multiplication method;

storing the c result values within a result data storage device;

repeating the loading k-coefficient values, performing modular multiplication and storing for each row of the coefficient matrix to form a partial output data packet;

storing the partial output data packet; and repeating the loading, loading, performing, storing, repeating and storing for each k×c column of the input data packet to form the output data packet.

10. The method of claim 1, wherein executing operations of the selected modular multiplication operation according to the selected data access pattern further comprises:

loading a k×p input data packet within the one or more multiplier data storage devices, where k and p are integer values;

loading a kth row of a k'×k coefficient matrix into a coefficient data storage device, where k' is an integer value<k;

performing modular multiplication of each kth coefficient value of the row of coefficient values with each data value within a corresponding kth row of the input data packet to form a plurality of result values utilizing the selected modular multiplication method;

summing corresponding pairs of the plurality of result values to form p-result values of a row of partial output data packet;

storing the p-result values within one or more result data storage devices; and repeating the loading, performing, summing and storing for each row of the coefficient matrix to form an output data packet having k' rows of p-result values.

11. An article of manufacture including a computer readable storage medium encoded with computer executable instructions that, when executed, perform a method comprising:

receiving a selected modular multiplication operation available from an operating environment according to a data processing/communication operation;

determining a vertical data access pattern time according to the data processing/communication operation;

determining a horizontal data access pattern time according to the data processing/communication operation;

selecting one of a vertical data access pattern and a horizontal data access pattern as a selected data access pattern that reduces a data access pattern time required to compute the selected modular multiplication operation according to the data processing/communication operation;

accessing of data from an input data packet stored in memory according to the selected data access pattern for the data processing/communication operation; and executing the selected modular multiplication operation to generate modular multiplication results for data accessed from memory according to the selected data access pattern.

12. The article of manufacture of claim 11, wherein executing the selected modular multiplication operation further comprises:

simultaneously multiplying, in response to executing a selected a single instruction multiple data (SIMD) modular multiplication instruction, corresponding pairs of byte multiplicand values ($G_i$) and byte multiplier values ($X_i$) according to the following equation:

$$G_i \otimes X_i = Y_i \text{ modulo } M_i,$$

wherein symbol $\otimes$ refers to a byte-modular multiplication operation, $Y_i$ refers to byte multiplication result values and $M_i$ refers to a byte modulo value of one or more byte modulo; and storing the result values $Y_i$ within corresponding portions of a destination data storage device.

13. The article of manufacture of claim 11, wherein executing the selected modular multiplication operation further comprises:

loading a plurality of data values $X_i$ within a multiplier data storage device;

loading a plurality of result values within a multiplicand data storage device and a result data storage device;

performing, in response to executing a single instruction multiple data (SIMD) data shuffle instruction, reordering of result values within the multiplicand data storage device according to a respective N-least significant bits of each data value within the multiplier data storage device;

performing, in response to executing a SIMD data shuffle instruction, values within the result data storage device according to a respective M-most significant bits of each respective data value within the multiplier data storage device;

performing a logical XOR operation of the corresponding pair of result values within the multiplicand data storage device and the result data storage device to form a plurality of modular multiplication values; and storing the plurality of modular multiplication values within corresponding positions of the result data storage device.

14. The article of manufacture of claim 11, wherein executing the selected modular multiplication operation according to the selected data access pattern further comprises:

loading a k×c column of an input data packet within one or more multiplier data storage devices, where k and c are integer values;

loading k coefficient values from a row of a coefficient matrix within one or more multiplicand data storage devices;

performing modular multiplication of each coefficient value from the row of k-coefficient values with a corresponding kth row of the k×c input data column to form c result values utilizing the selected modular multiplication method;

storing the c result values within a result data storage device;

repeating the loading k-coefficient values, performing modular multiplication and storing for each row of the coefficient matrix to form a partial output data packet;
storing the partial output data packet; and
repeating the loading, loading, performing, storing, repeating and storing for each k×c column of the input data packet to form an output data packet.

15. The article of manufacture of claim 11, wherein executing the selected modular multiplication operation further comprises:
loading a k×p input data packet within the one or more multiplier data storag devices; where k and p are integer values;
loading a kth row of a k'×k coefficient matrix, where k' is an integer value <k;
performing modular multiplication of each kth coefficient value of the row of coefficient values with each data value within a corresponding kth row of the input data packet to form a plurality of result values utilizing the selected modular multiplication method;
summing corresponding pairs of the plurality of result values to form p-result values of a row of partial output data packet;
storing the p-result values within one or more result data storage devices; and
repeating the loading, performing, summing and storing for each row of the coefficient matrix to form an output data packet having k' rows of p-result values.

16. An apparatus, comprising:
a processor having circuitry to execute instructions;
at least one data storage device coupled to the processor, the data storage device to store data values and coefficient values to enable modular multiplication of corresponding data and coefficient values;
a storage device coupled to the processor, encoded with sequences of computer executable instructions, which when executed by the processor cause the processor to:
receive a selected modular multiplication operation available from an operating environment according to a data processing/communication operation,
determine a vertical data access pattern time according to the data processing/communication operation;
determine a horizontal data access pattern time according to the data processing/communication operation;
select one of a vertical data access pattern and a horizontal data access pattern as a selected data access pattern that reduces an access pattern time required to compute the selected modular multiplication operation for the data processing/communication operation;
access of data from an input data packet stored within the data storage device according to the selected data access pattern for the data processing/communication operation,
execute the selected modular multiplication operation to generate modular multiplication results for data accessed from the data storage device according to the selected data access pattern, and
generate an output data packet corresponding to the data processing/communication operation according to the generated modular multiplication results in a reduced amount of time.

17. The apparatus of claim 16, wherein the instruction to execute the selected modular multiplication operation causes the processor to:
simultaneously multiply, in response to executing a selected a single instruction multiple data (SIMD) modular multiplication instruction, corresponding pairs of byte multiplicand values ($G_i$,) and byte multiplier values ($X_i$) according to the following equation:

$$G_i X_i = Y_i \text{ modulo } M_i,$$

wherein symbol refers to a byte-modular multiplication operation, Y, refers to byte multiplication result values and M, refers to a byte modulo value of one or more byte modulo values; and
store the result values $Y_i$ within corresponding portions of a destination data storage device.

18. The apparatus of claim 16, wherein the instruction to perform the modular multiplication utilizing the a single instruction multiple data (SIMID) modular multiplication look-up table operation causes the processor to:
load a plurality of data values X1 within a multiplier data storage device;
load a plurality of result values within a multiplicand data storage device and a result data storage device;
perform, in response to executing a SIMD data shuffle instruction, reordering of result values within the multiplicand data storage device according to a respective N-least significant bits of each data value within the multiplier data storage device;
perform, in response to executing a SIMD data shuffle instruction, values within the result data storage device according to a respective M-most significant bits of each respective data value within the multiplier data storage device;
perform a logical XOR operation of the corresponding pair of result values within the multiplicand data storage device and the result data storage device to form a plurality of modular multiplication values; and
store the plurality of modular multiplication values within corresponding positions of the result data storage device.

19. The apparatus of claim 16, wherein the executing operations of the selected modular multiplication operation according to the selected data access pattern causes the processor to:
load a k×c colunm of an input data packet within one or more multiplier data storage devices, where k and c are integer values;
load k coefficient values from a row of a coefficient matrix within one or more multiplicand data storage devices;
perform modular multiplication of each coefficient value from the row of k-coefficient values with a corresponding kth row of the k×c input data column to form c result values utilizing the selected modular multiplication method;
store the c result values within a result data storage device;
repeat the loading k-coefficient values, performing modular multiplication and storing for each row of the coefficient matrix to form a partial output data packet;
store the partial output data packet; and
repeat the loading, loading, performing, storing, repeating and storing for each k×c column of the input data packet to form an output data packet.

20. The apparatus of claim 16, wherein the instruction to execute the selected modular multiplication operation causes the processor to:
load a k×p input data packet within the one or more multiplier data storage devices, where k and p are integer values;
load a kth row of a k'×k coefficient matrix, where k' is an integer value <k;

perform modular multiplication of each kth coefficient value of the row of coefficient values with each data value within a corresponding kth row of the input data packet to form a plurality of result values utilizing the selected modular multiplication method;

sum corresponding pairs of the plurality of result values to form p-result values of a row of a partial output data packet;

store the p-result values within one or more result data storage devices; and repeat the load, perform, sum and store for each row of the coefficient matrix to form a k'×p output data packet having k' rows of p-result values.

21. A system comprising:

a processor including an execution unit having circuitry to execute instructions;

a memory subsystem coupled to the processor via a bus, the memory subsystem containing image/video data values and coefficient values; and at least one data storage device coupled to the processor, the data storage device to store data values and coefficient values to enable modular multiplication of corresponding data and coefficient values, wherein the execution unit is to simultaneously multiply corresponding pairs of coefficient values and data values within the data storage device according to a selected modular multiplication operation; and wherein the processor loads coefficient values and data values for the memory subsystem within the data storage devices according to a selected data access pattern from one of a vertical data access pattern and a horizontal data access pattern for accessing the coefficient values and data values from the memory subsystem, the selected data access pattern to reduce a data access pattern time required to compute the selected modular multiplication operation according to a data processing/communication operation to generate an output data packet corresponding to the data processing/communication operation according to the generated modular multiplication results in a reduced amount of time;

wherein the selected data access pattern is the one of the vertical data access pattern and a horizontal data access pattern selected by a user according to the data communications processing operation.

22. The system of claim 21, wherein the processor further comprises:

an arithmetic logic unit to simultaneously multiply corresponding pairs of corresponding coefficient values and data values according to the selected modular multiplication operation to form a plurality of result values.

23. The system of claim 22, wherein the arithmetic logic unit modular multiplies corresponding pairs of byte coefficient values and byte data values to produce a plurality of byte result values according to the selected modular multiplication operation.

24. The system of claim 21, wherein the execution unit executes instructions to implement one of a SJMD modular multiplication instruction, a single instruction multiple data (SIMD) N-byte look-up table modular multiplication operation and a scalar look-up table operation.

* * * * *

UNITED STATES PATENT AND TRADEMARK OFFICE
CERTIFICATE OF CORRECTION

PATENT NO. : 7,343,389 B2
APPLICATION NO. : 10/137560
DATED : March 11, 2008
INVENTOR(S) : Macy et al.

Page 1 of 1

It is certified that error appears in the above-identified patent and that said Letters Patent is hereby corrected as shown below:

In column 24, at line 28, delete " $G_i \otimes X_i = Y_i \text{ modulo } M_i,$ " and insert --$G_i \otimes X_1 = Y_i \text{ modulo } M_i,$--.

In column 28, at line 7, after "symbol" insert --⊗--.

Signed and Sealed this

Eighteenth Day of November, 2008

JON W. DUDAS
*Director of the United States Patent and Trademark Office*